Figure 1:
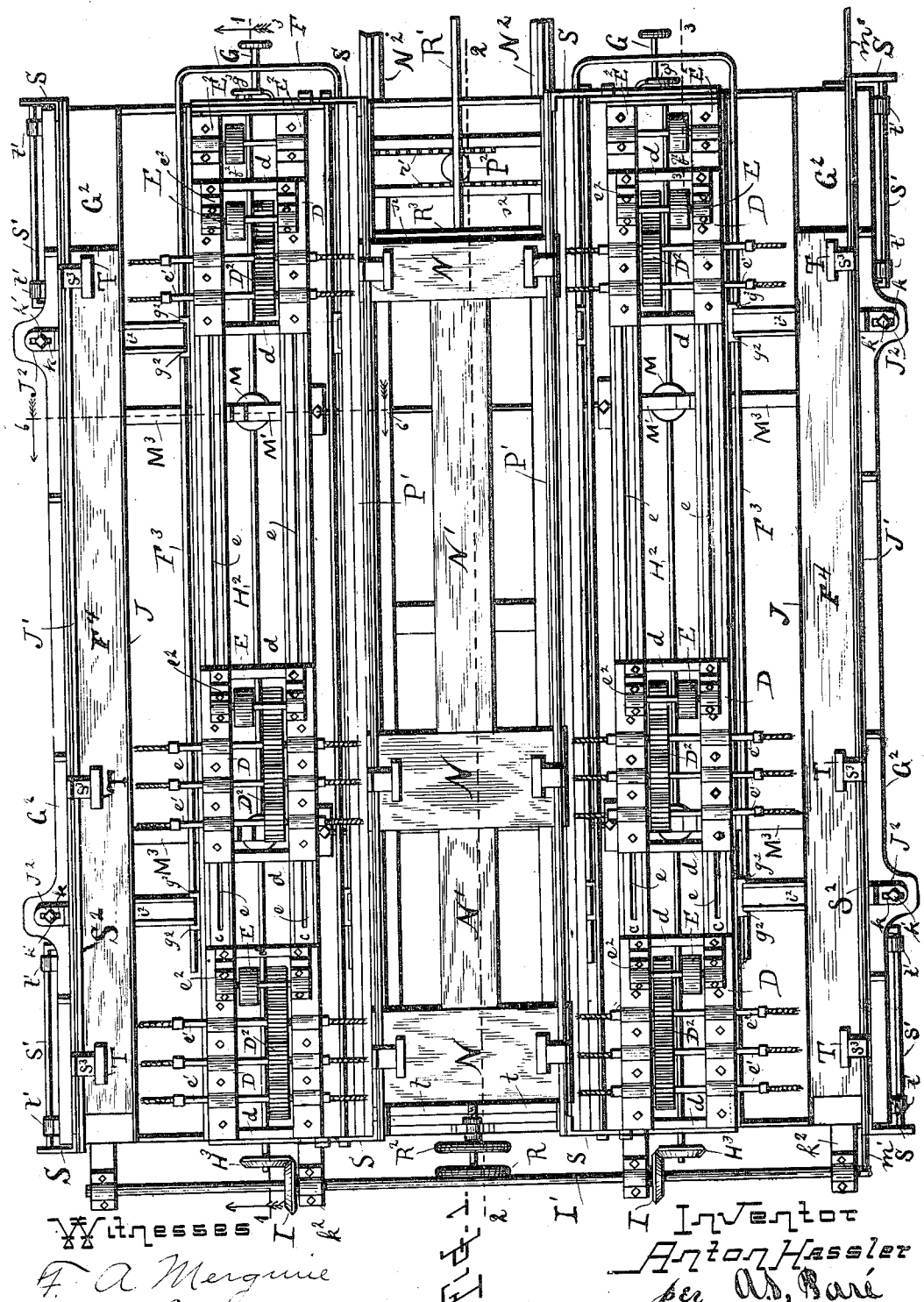

A. HASSLER.
BORING MACHINE.
APPLICATION FILED DEC. 29, 1896.
1,032,002.
Patented July 9, 1912.
22 SHEETS—SHEET 12.
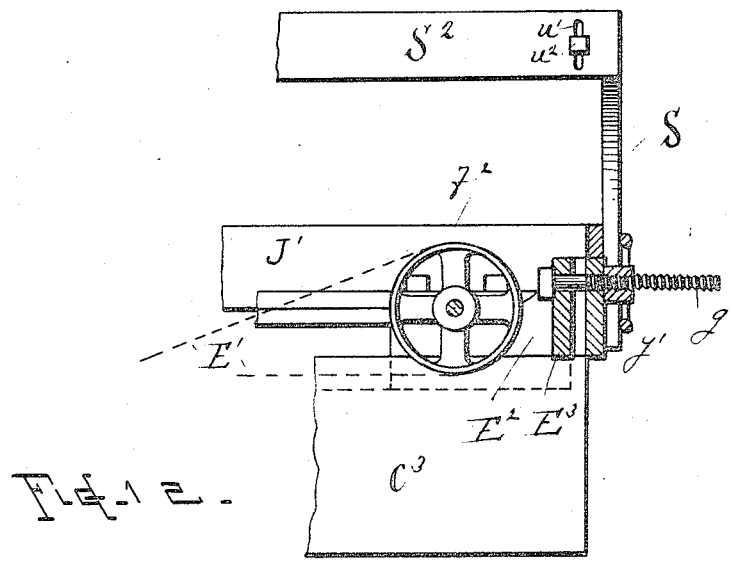
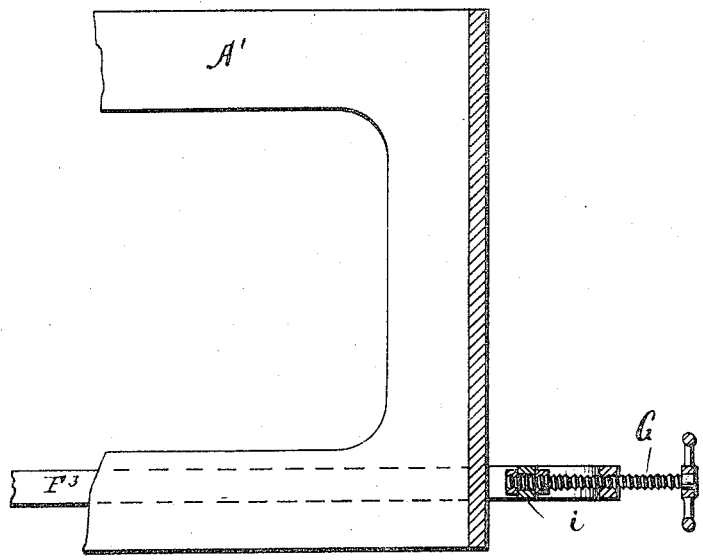
Fig. 12.
Witnesses
F. A. Merguire
E. A. Boell
Inventor
Anton Hassler
per W. S. Bair
Attorney

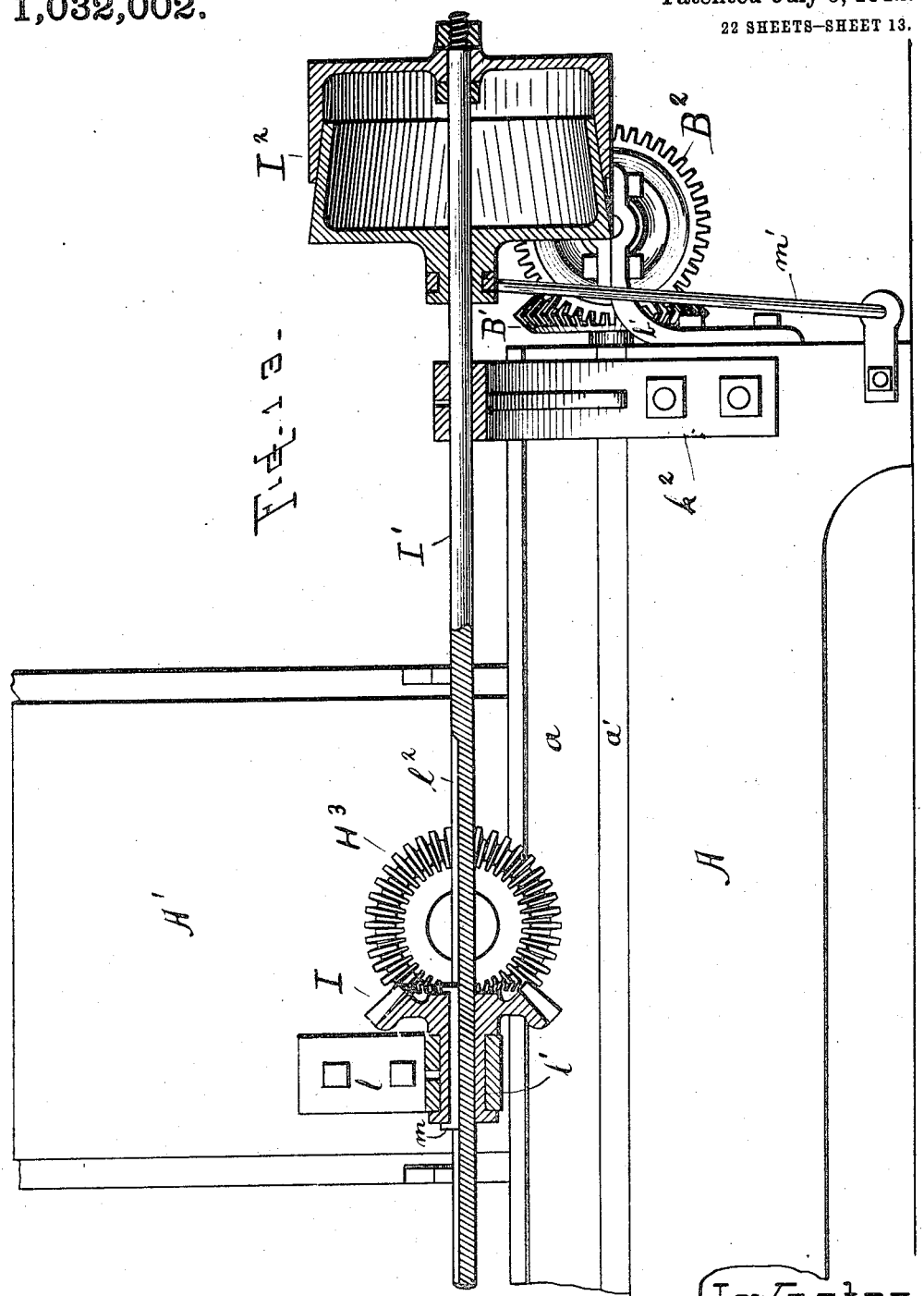

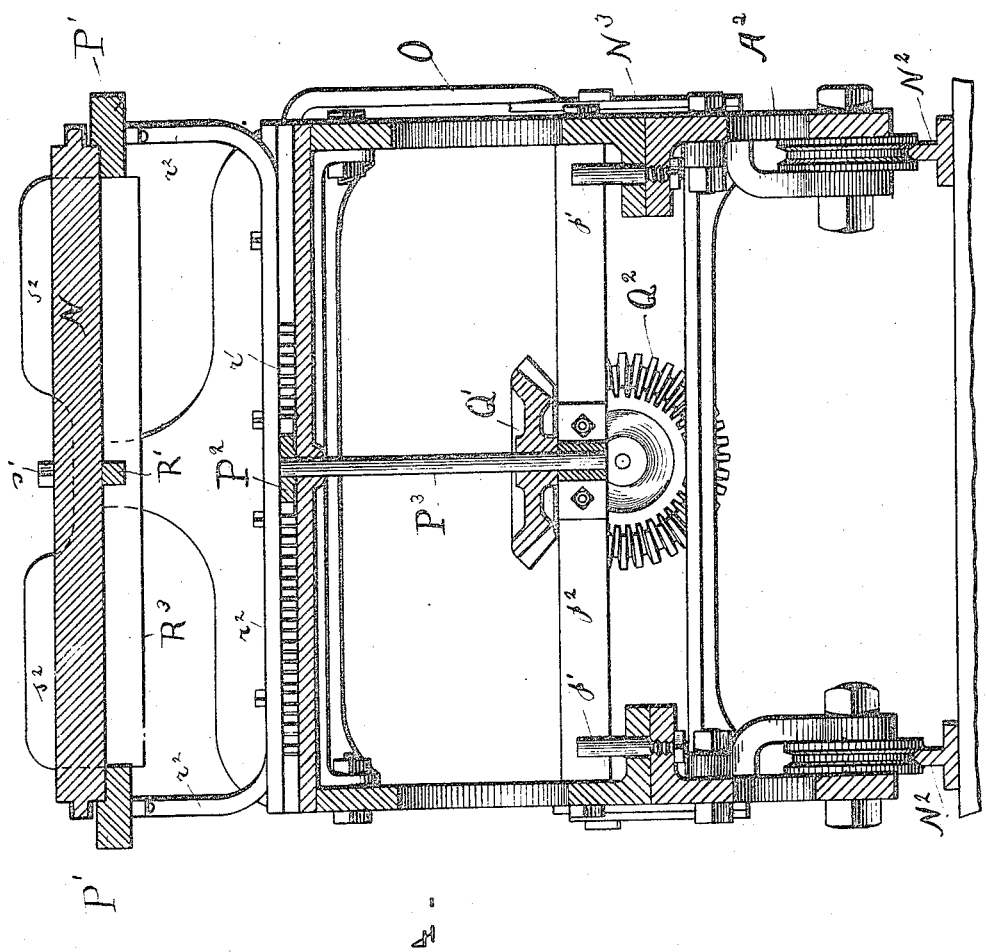

A. HASSLER.
BORING MACHINE.
APPLICATION FILED DEC. 29, 1896.
1,032,002.
Patented July 9, 1912.
22 SHEETS—SHEET 15.
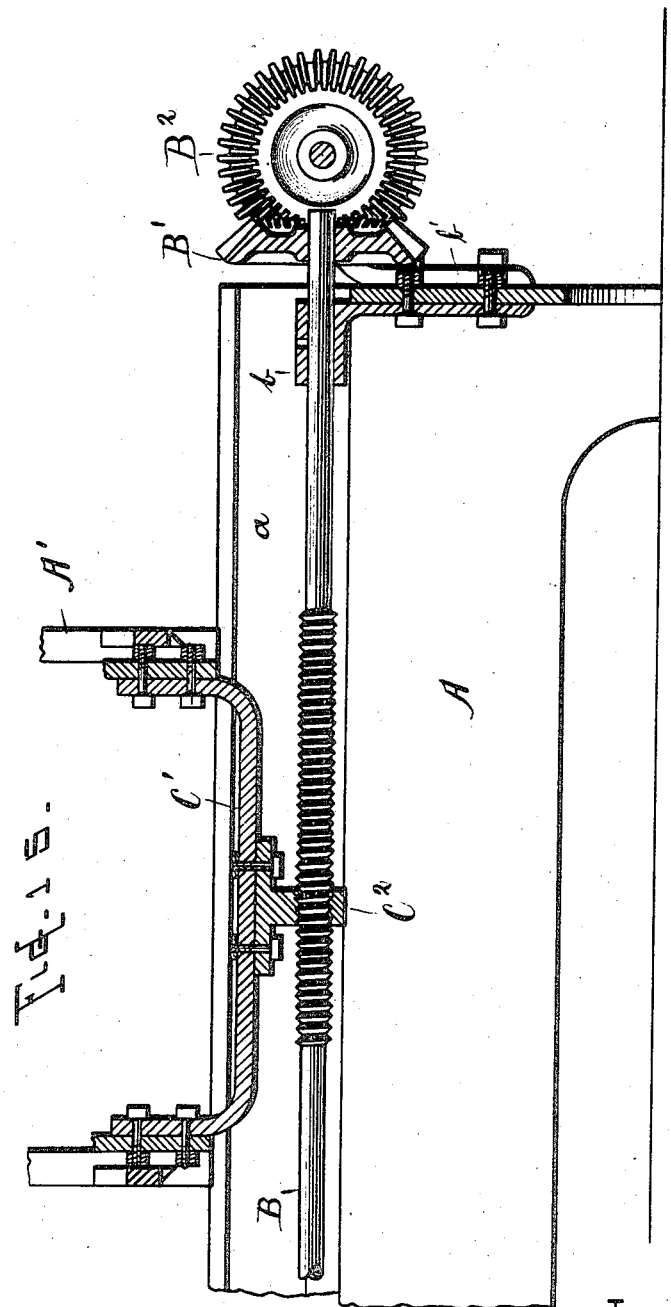

A. HASSLER.
BORING MACHINE.
APPLICATION FILED DEC. 29, 1896.
1,032,002.
Patented July 9, 1912.
22 SHEETS—SHEET 16.
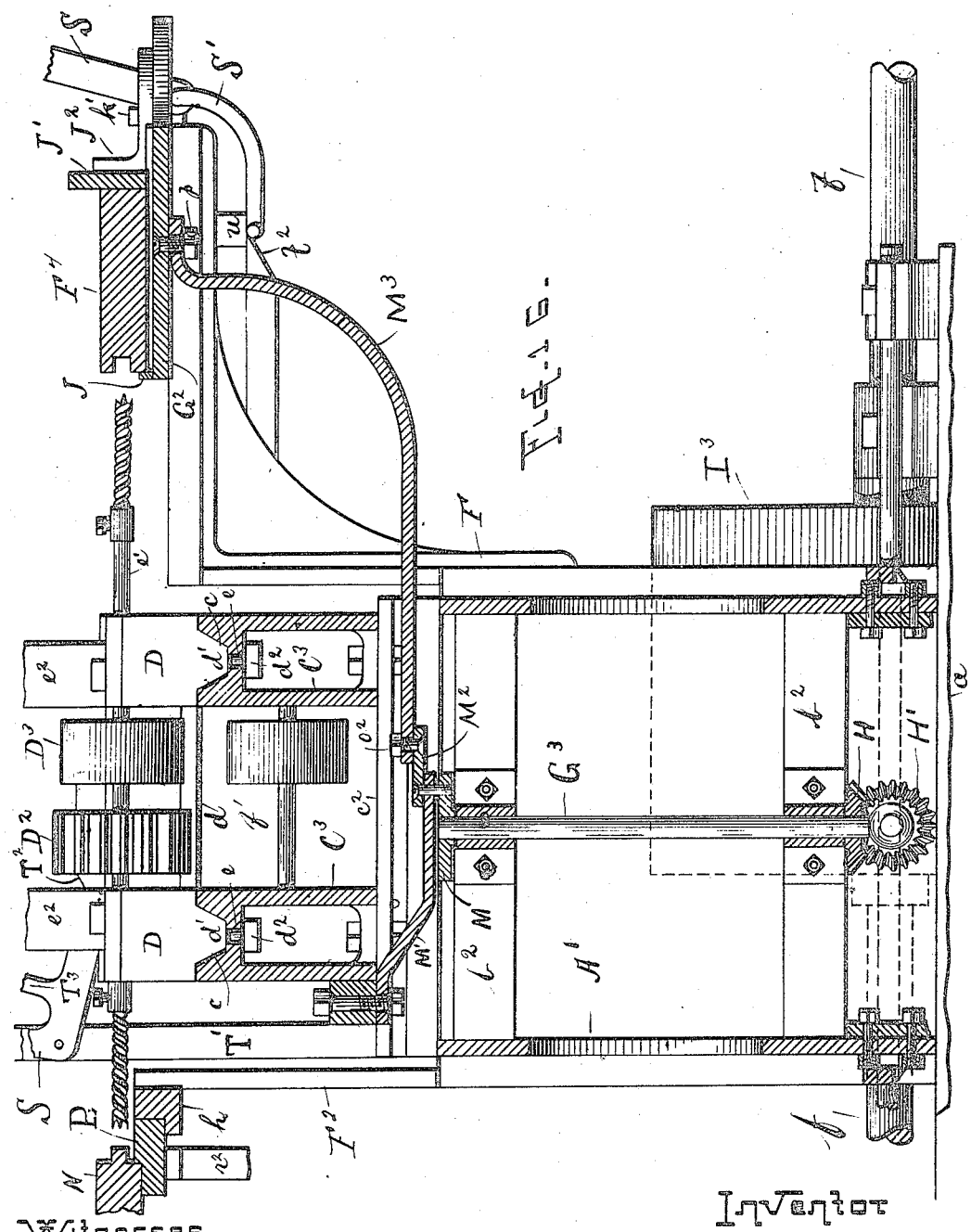
Witnesses
F. A. Mergure
E. A. Boell
Inventor
Anton Hassler
per A.S. Paré
Attorney

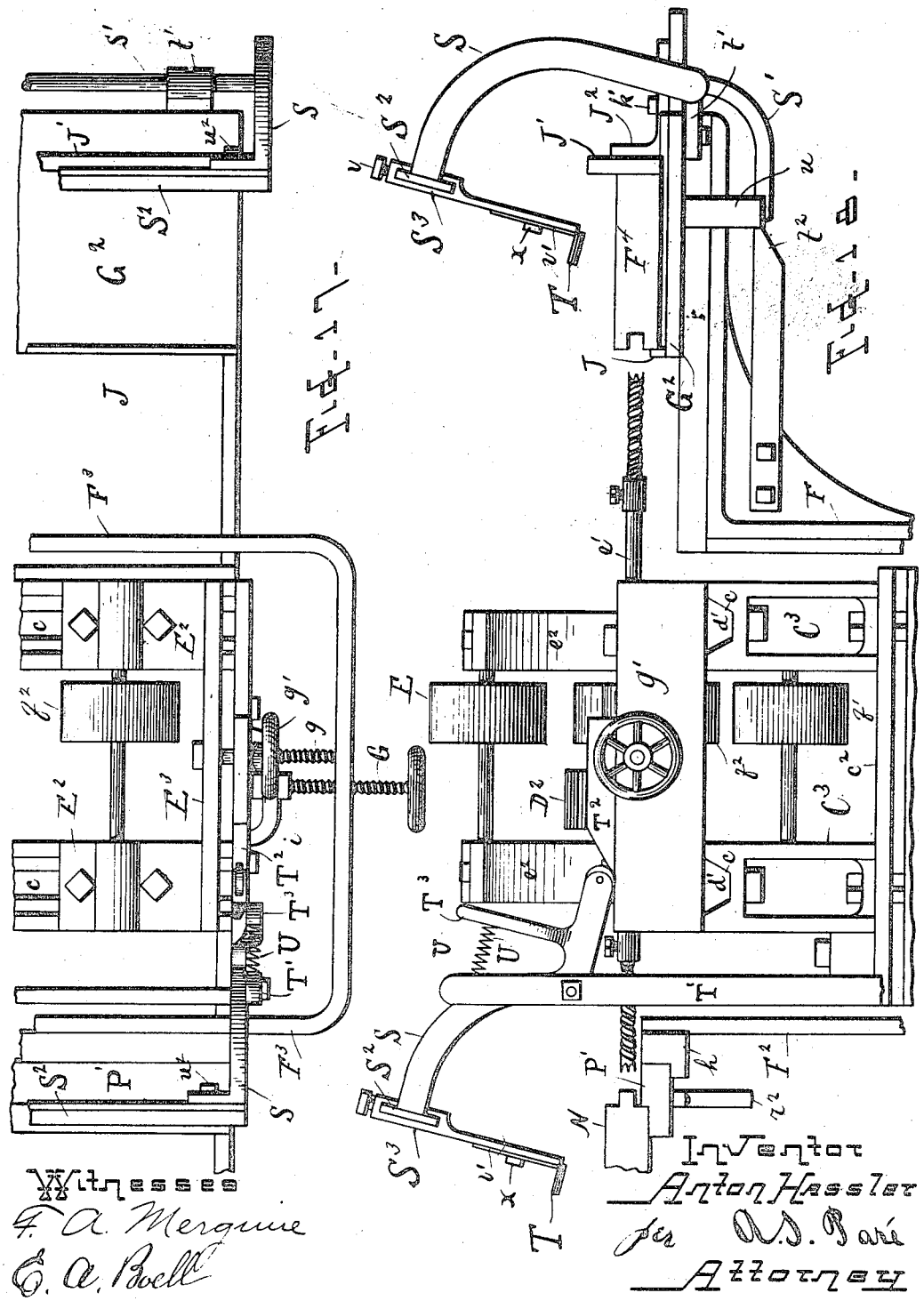

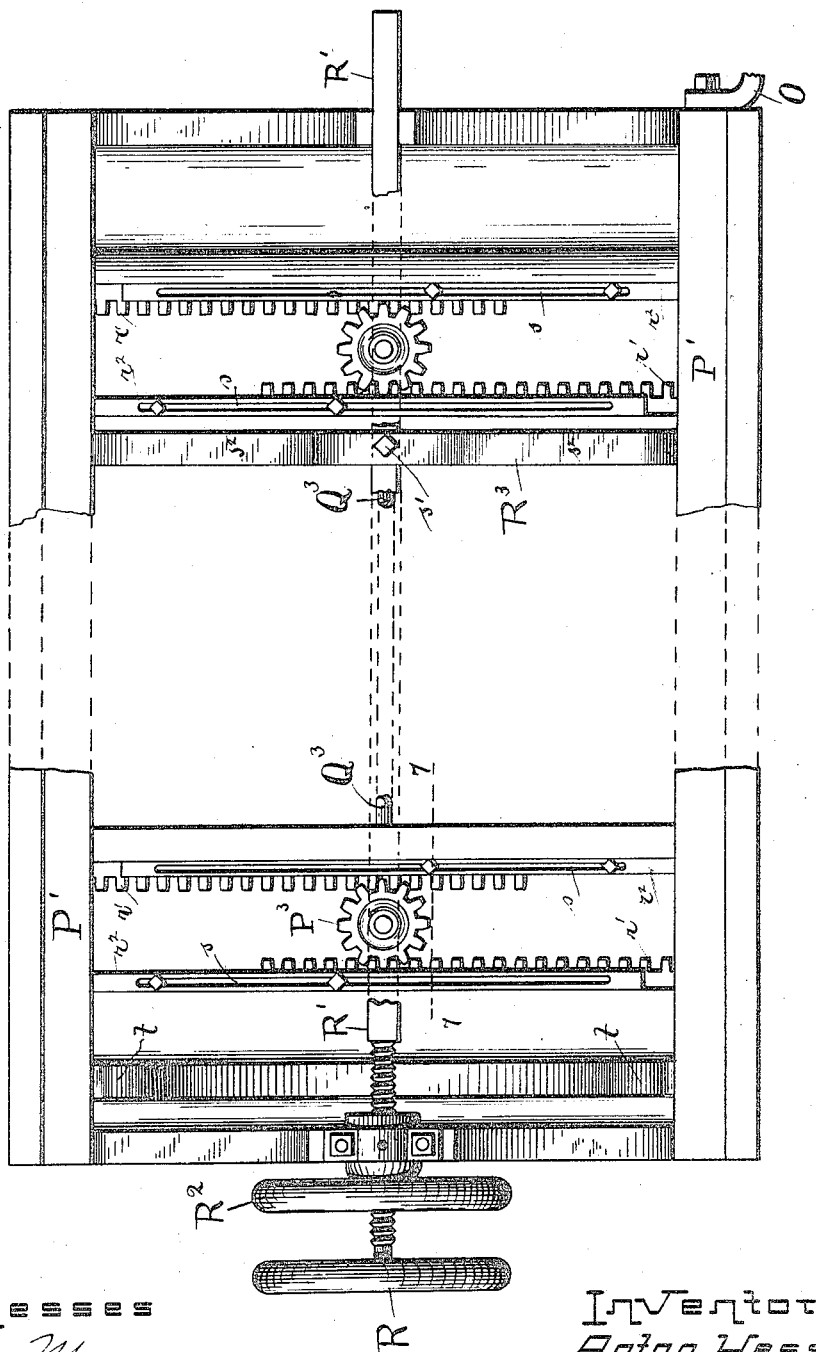

A. HASSLER.
BORING MACHINE.
APPLICATION FILED DEC. 29, 1896.
1,032,002.
Patented July 9, 1912.
22 SHEETS—SHEET 19.
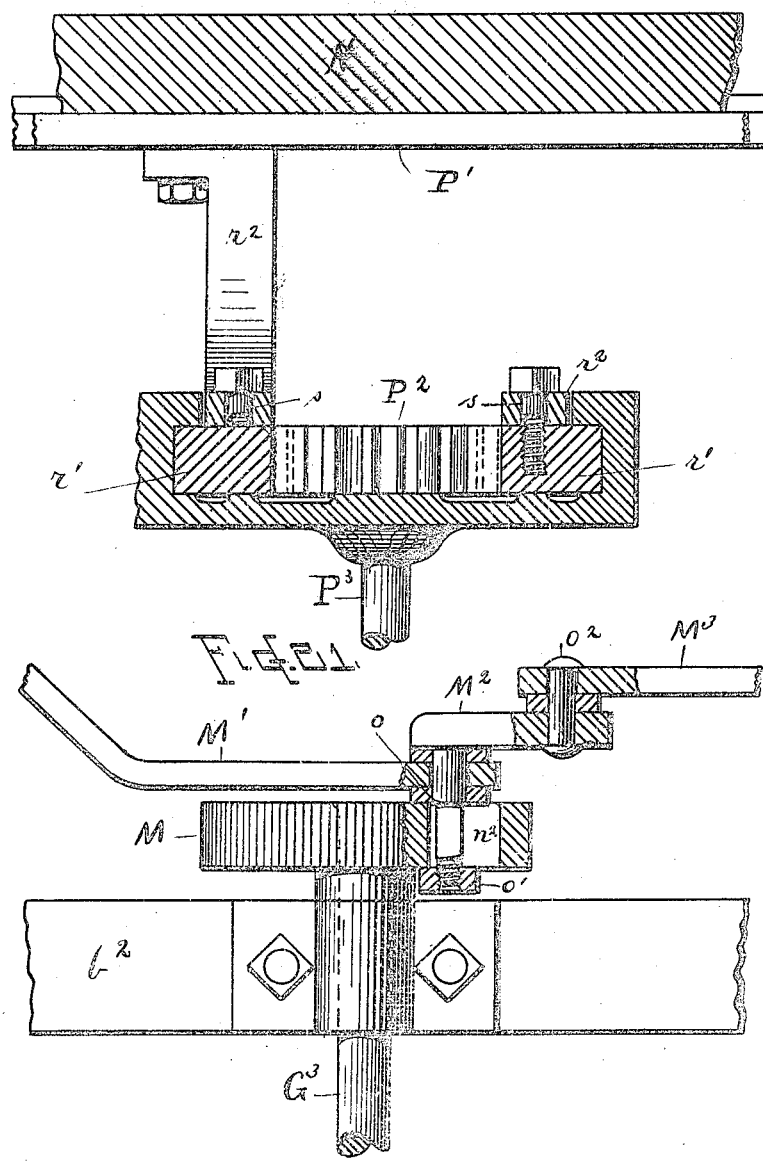

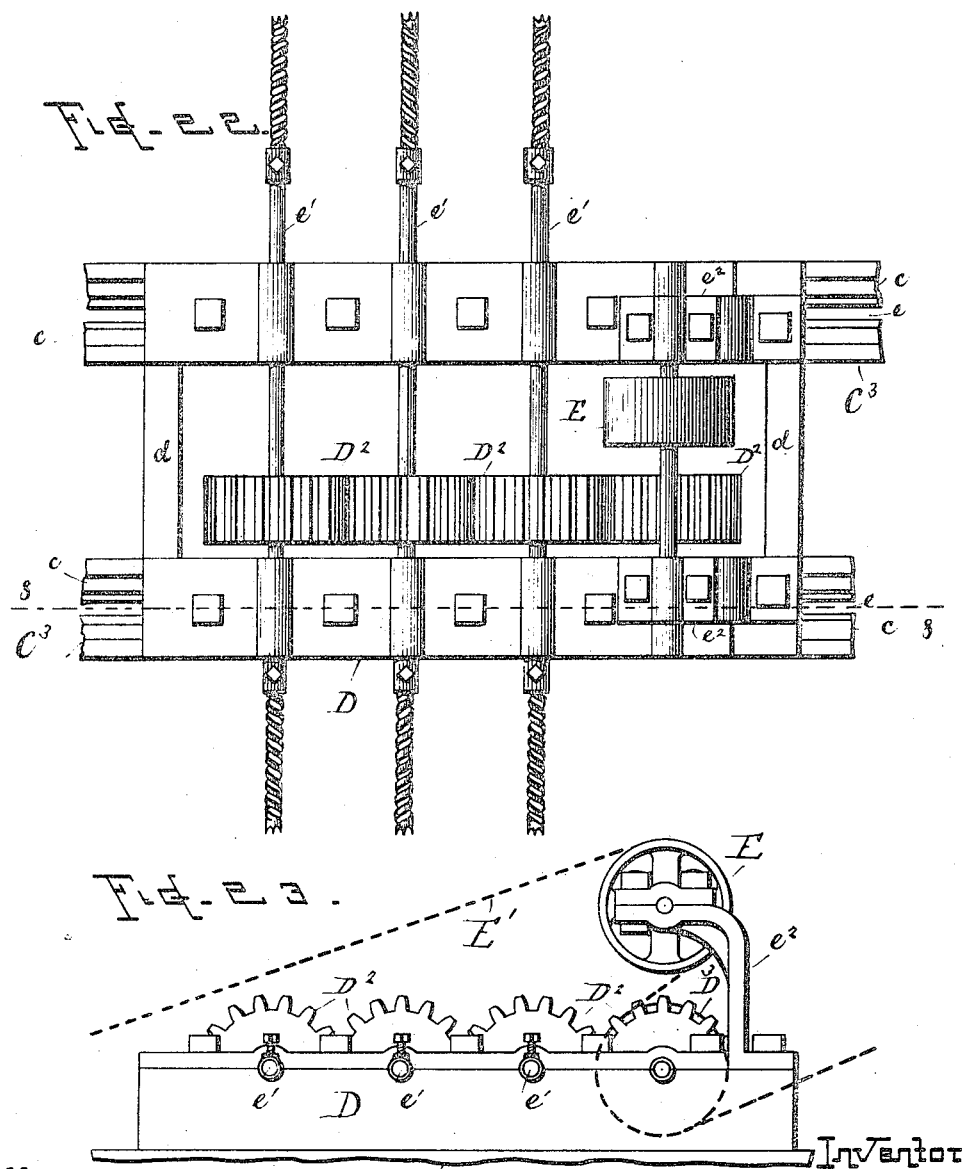

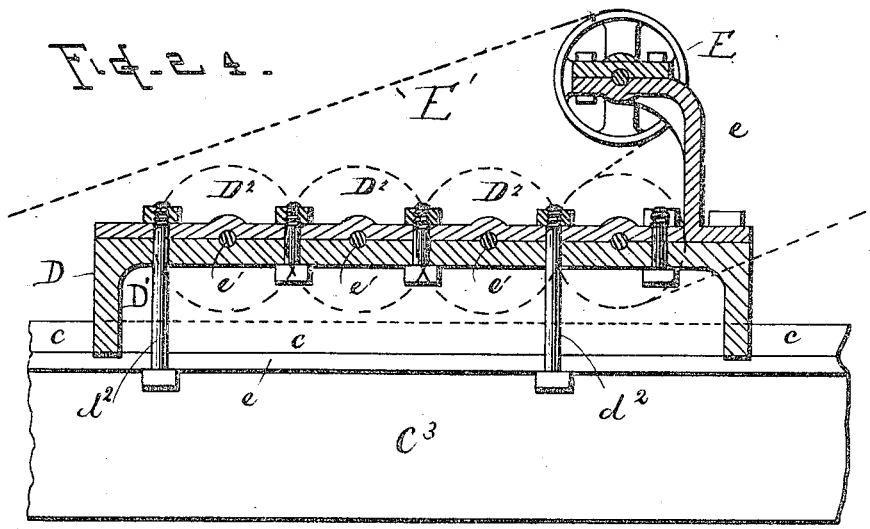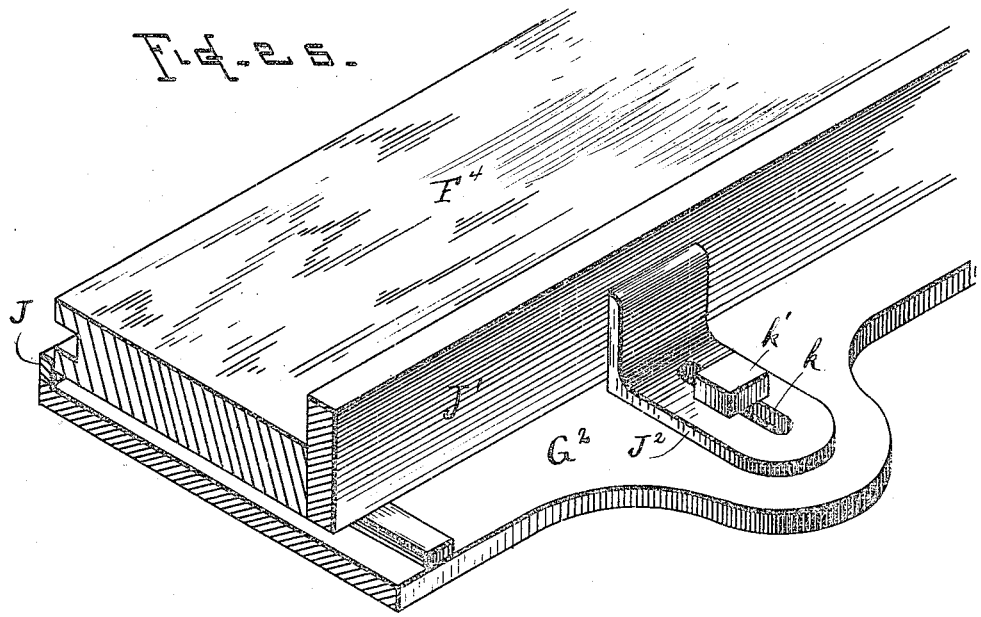

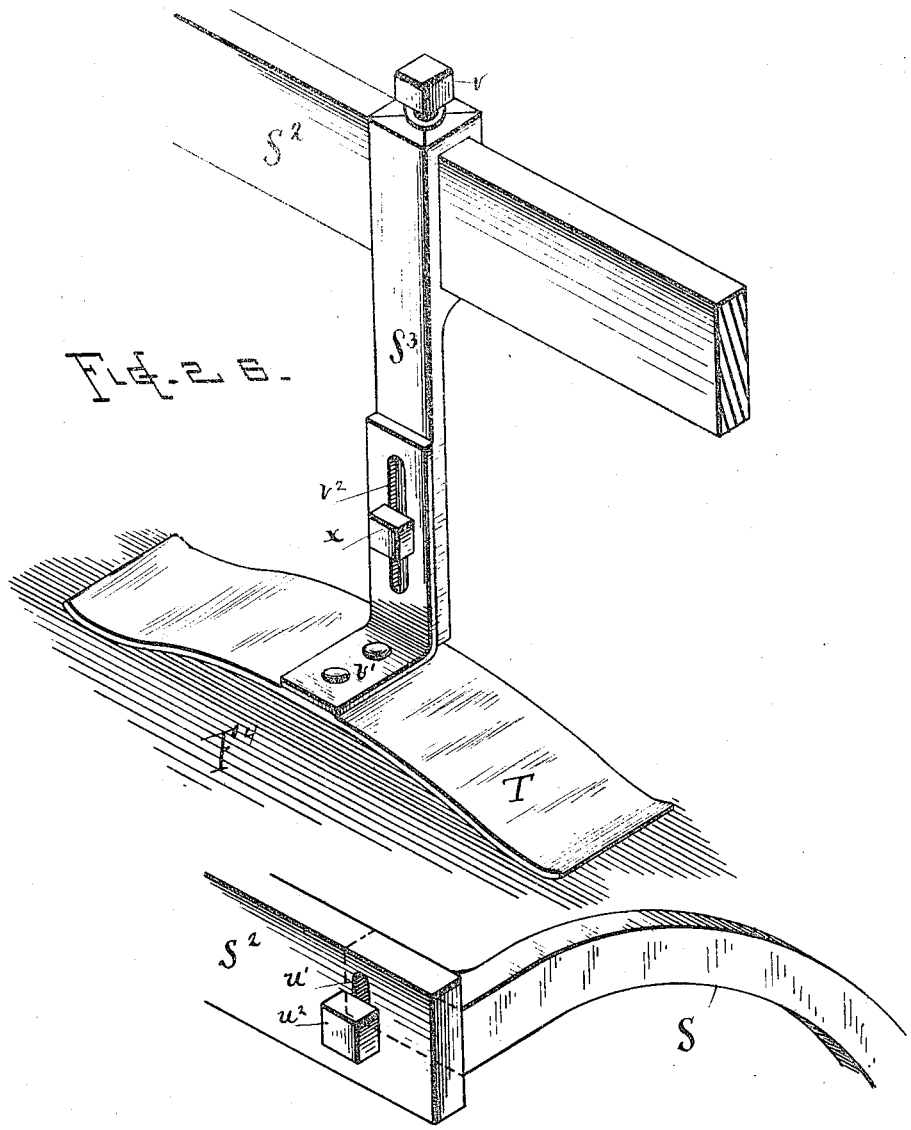

UNITED STATES PATENT OFFICE.

ANTON HASSLER, OF OAKLAND, CALIFORNIA.

BORING-MACHINE.

1,032,002.  Specification of Letters Patent.  Patented July 9, 1912.

Application filed December 29, 1896. Serial No. 617,413.

*To all whom it may concern:*

Be it known that I, ANTON HASSLER, a citizen of the United States, residing at Oakland, State of California, have invented certain new and useful Improvements in Boring-Machines; and I do hereby declare the following to be a clear, full, and exact description of the invention, such as will enable others skilled in the art to which it appertains to make and use the same.

My invention relates to that class of machine called a "boring-machine," constructed for boring holes in various substances. However, for the purpose of this application, I shall refer in the following description to a machine specially adapted to bore the stiles and rails of doors for the purpose of forming dowel-joints. Heretofore machines of this class have been made for the same purpose, but the rails and stiles were bored independently, and by various means.

The object of my invention is to produce a boring-machine which is simple in construction, effective in operation, and convenient in manipulation, so arranged that all the rails and stiles of a door can be bored simultaneously by the same power and same movement.

To these ends my invention consists, viz: First, to provide a suitable bed or base upon which three frames are mounted, two being adjustably secured to the bed and having an upper laterally adjustable section, while the other is removably held in position and provided with an upper vertically movable section. Secondly, to provide suitable frames upon which the various carriages provided with suitable bits can be adjusted to the position desired. Thirdly, to provide horizontally and vertically adjustable support or seat upon which the stiles and rails are held in position. Fourthly, to provide suitable mechanism whereby the upper laterally movable section and the stiles-seats move automatically and alternately for the purpose of boring the rails and stiles simultaneously. Fifthly, to provide adjustable carriages for the bits and means to rotate the bits alternately. Sixthly, to provide suitable means for tightening and supporting the driving belt in position. Seventhly, to provide automatic downward pressure and other means upon the stiles and rails for the purpose of holding them rigid to their respective seats while boring the same. Eighthly, to further provide appliances and improvements in various parts of the machine, whereby efficiency in operation and convenience in manipulation are materially increased, and which will be hereafter fully described and claimed.

As a full and complete understanding of my invention can be had to better advantage by a detailed description thereof, I will now proceed to describe the preferred embodiment of the invention, reference being had to the accompanying drawings, which form a part of these specifications, in which—

Figure 2:
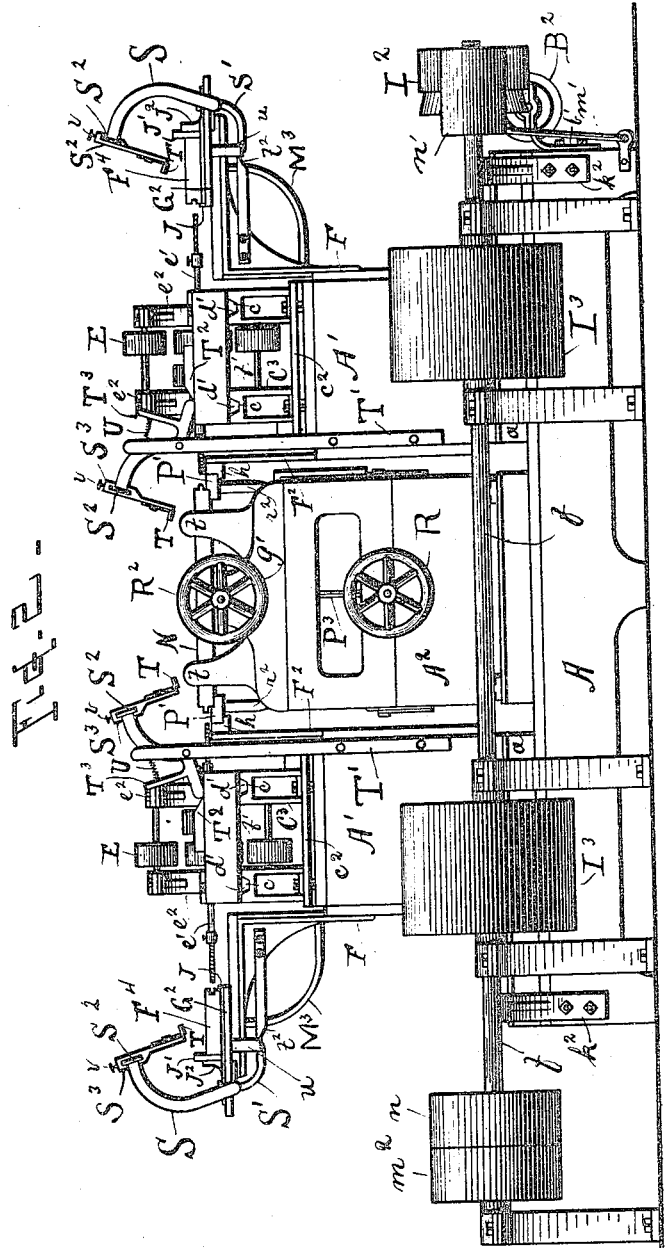
Figure 3:
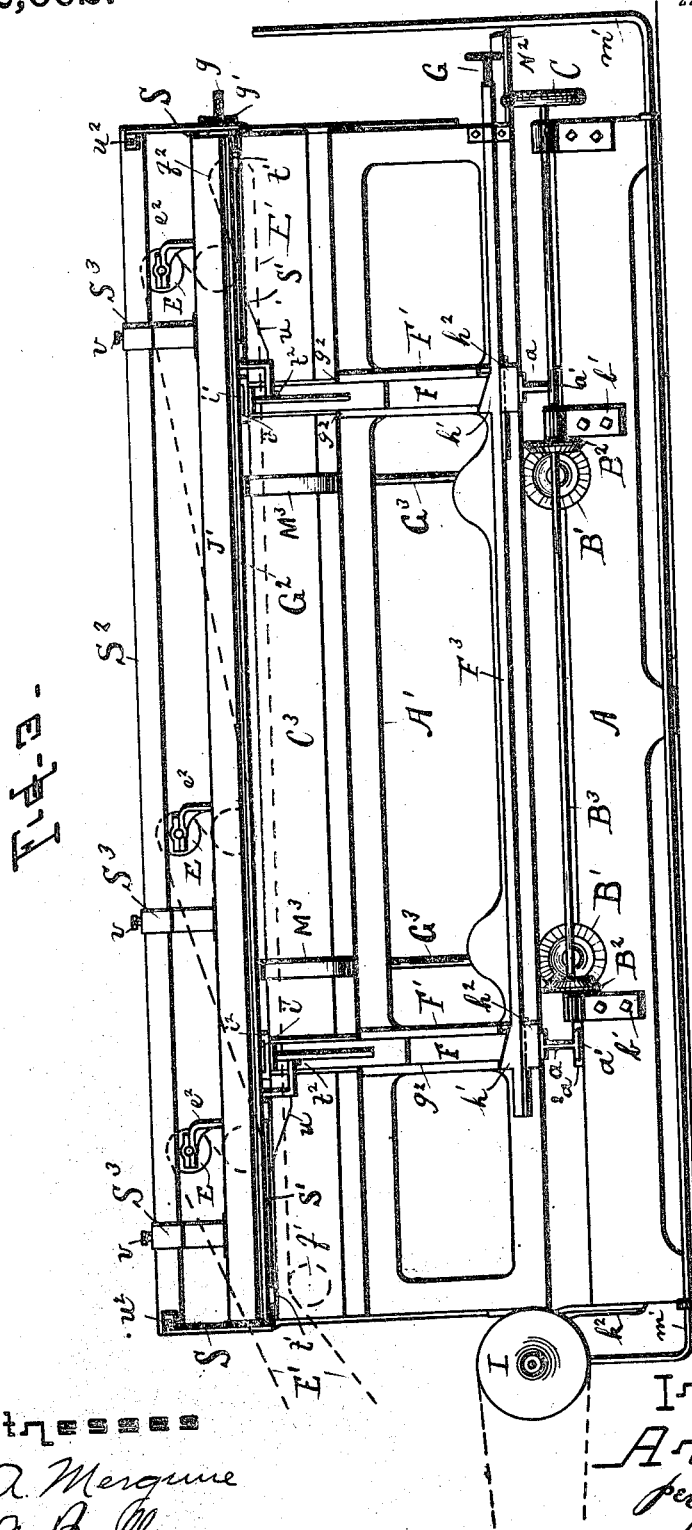
Figure 4:
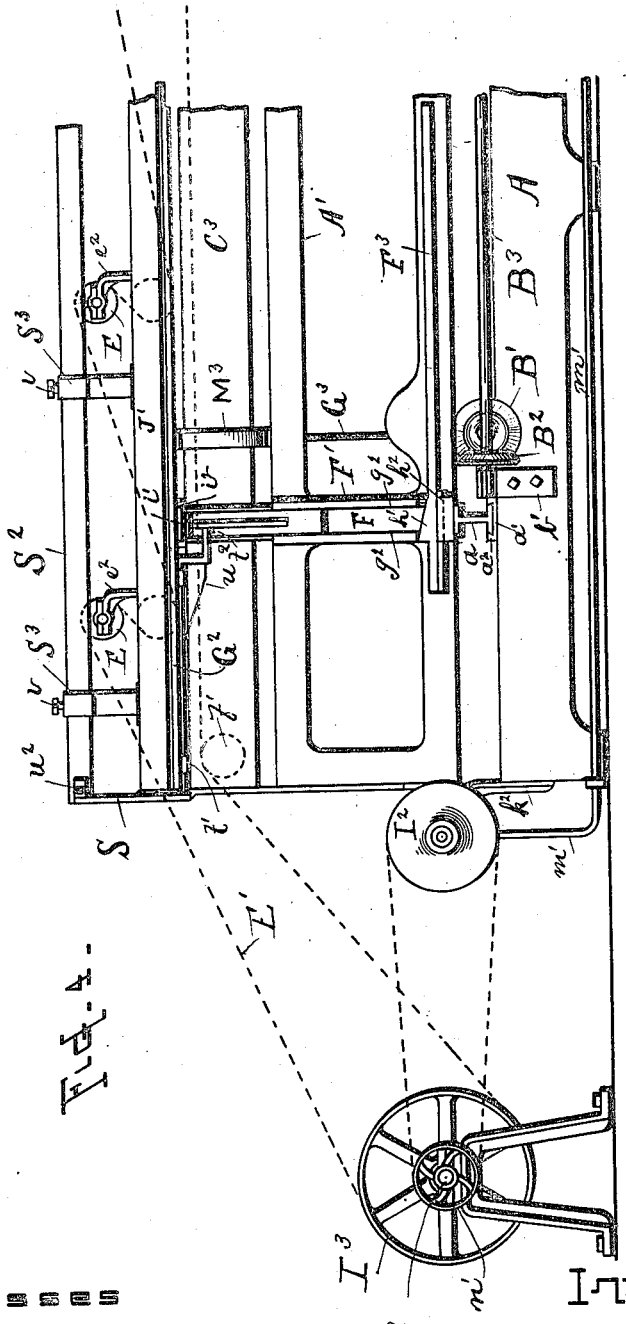
Figure 5:
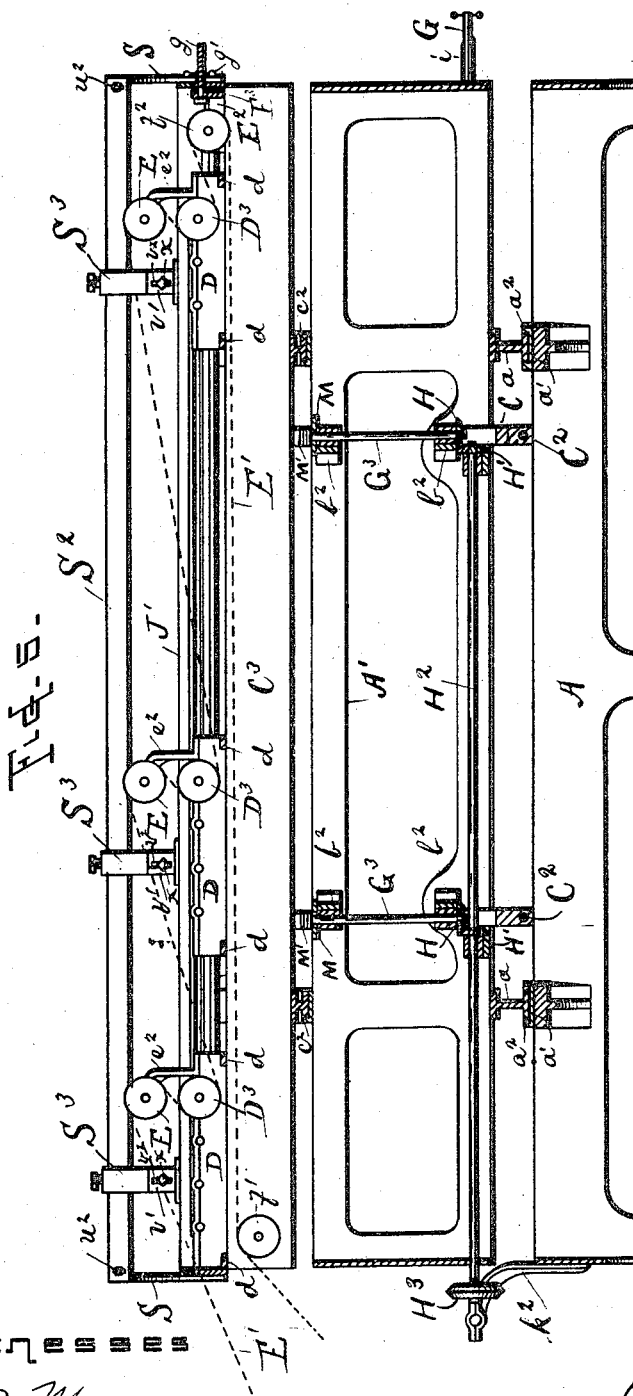
Figure 6:
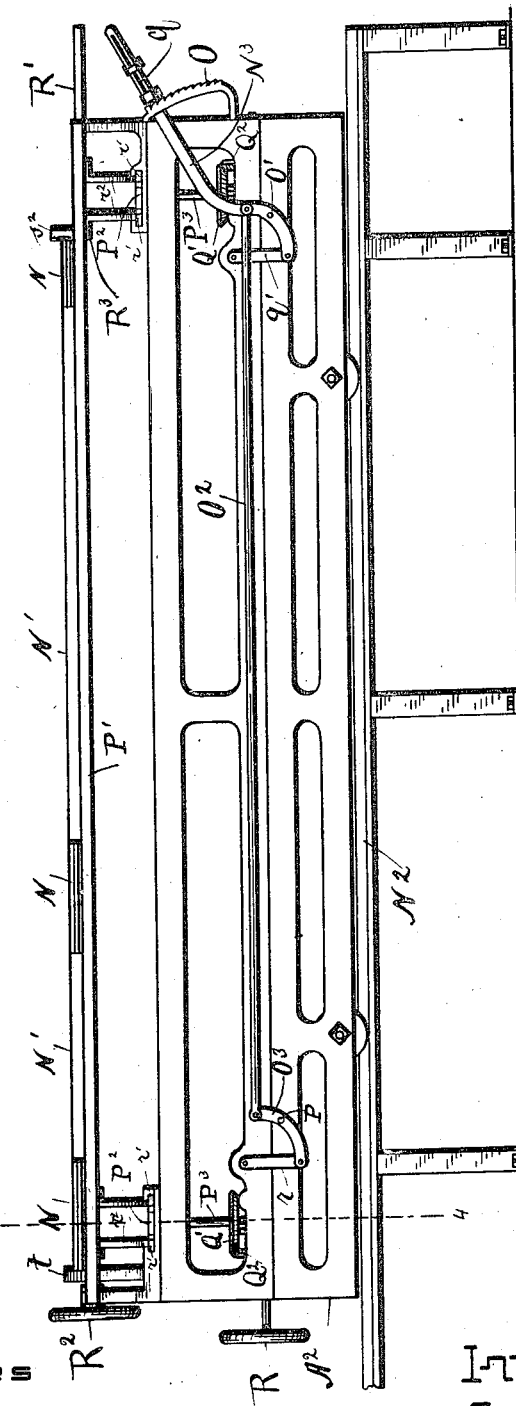
Figure 7:
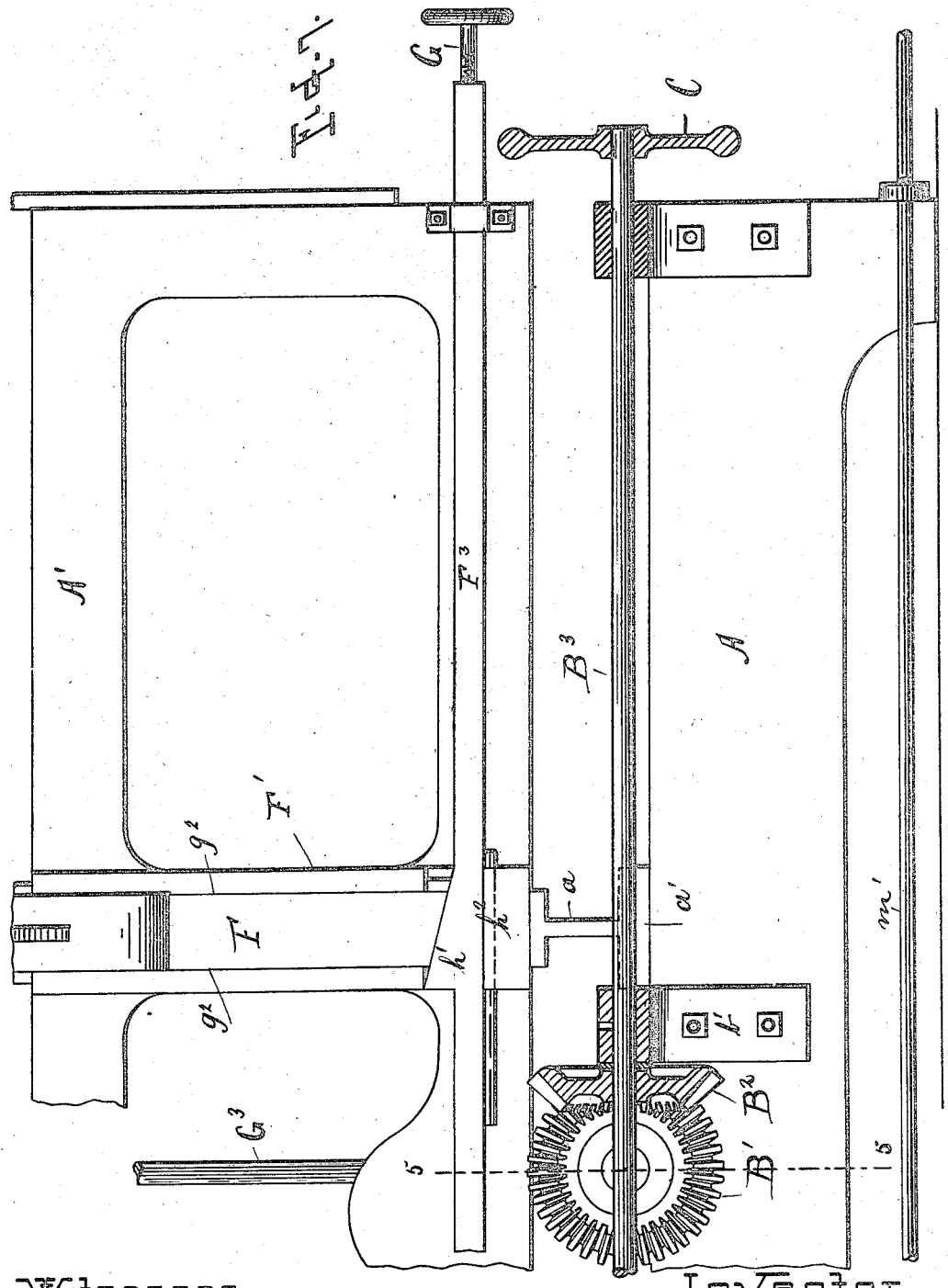
Figure 8:
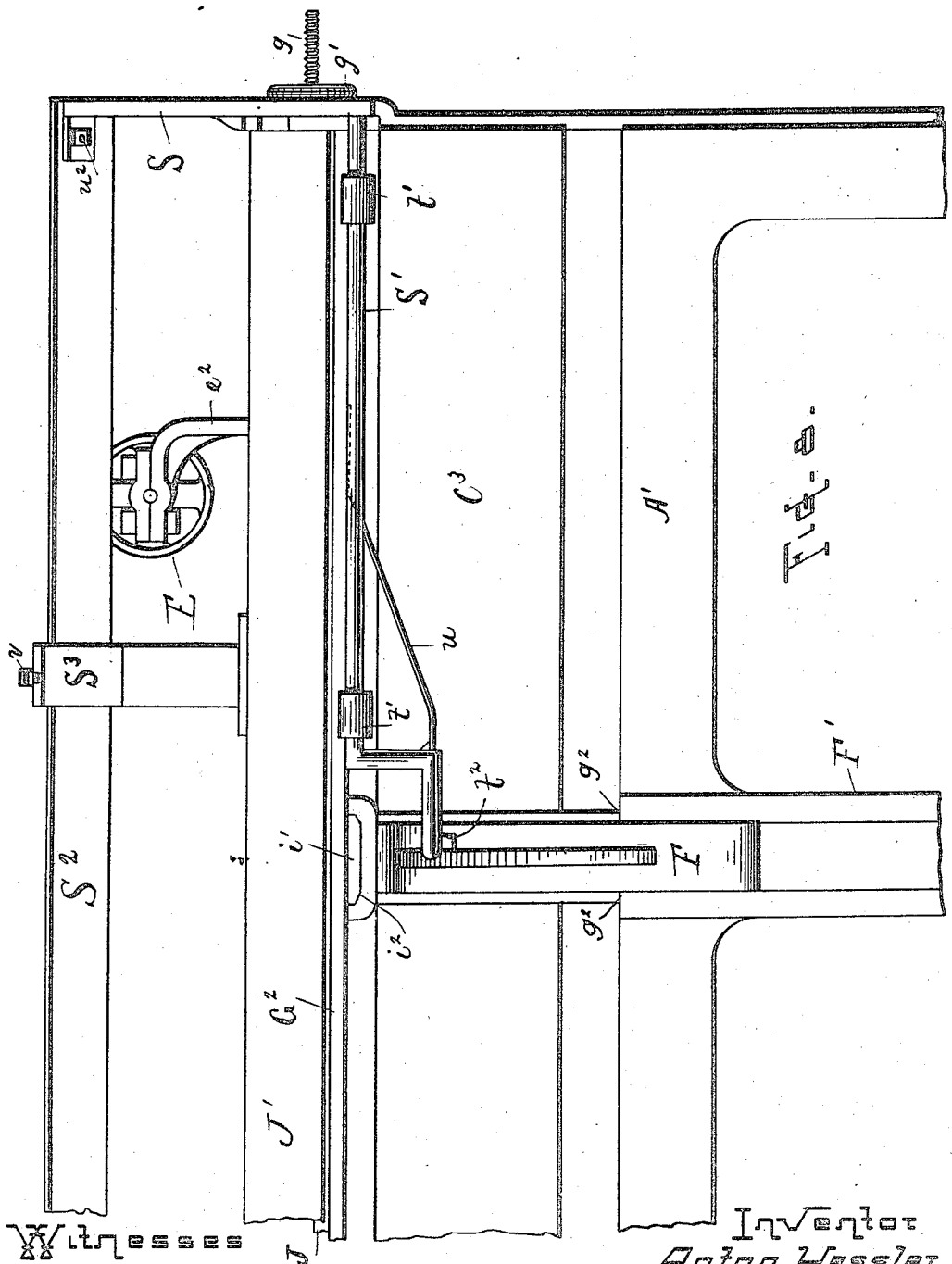
Figure 9:
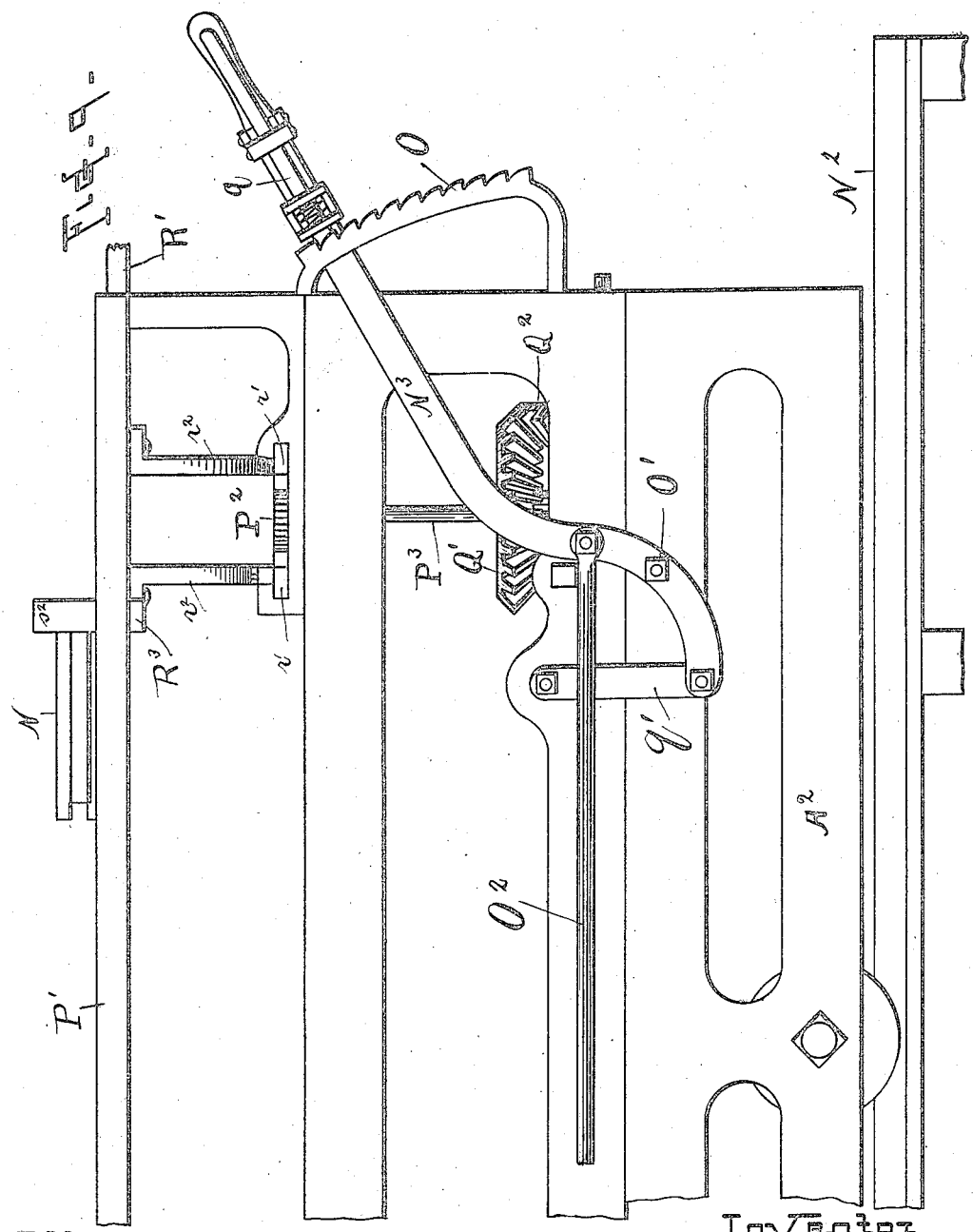
Figure 10:
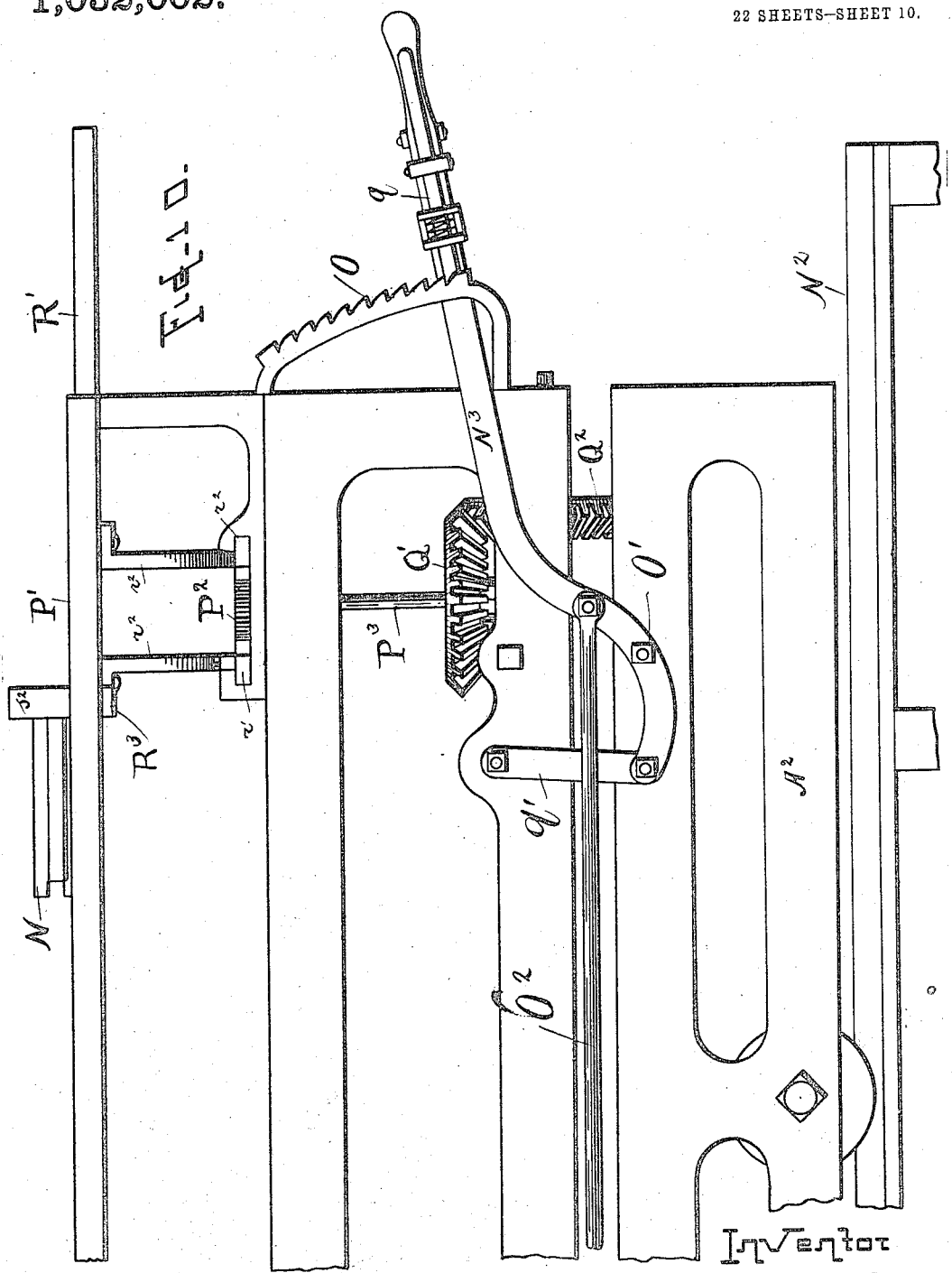
Figure 11:
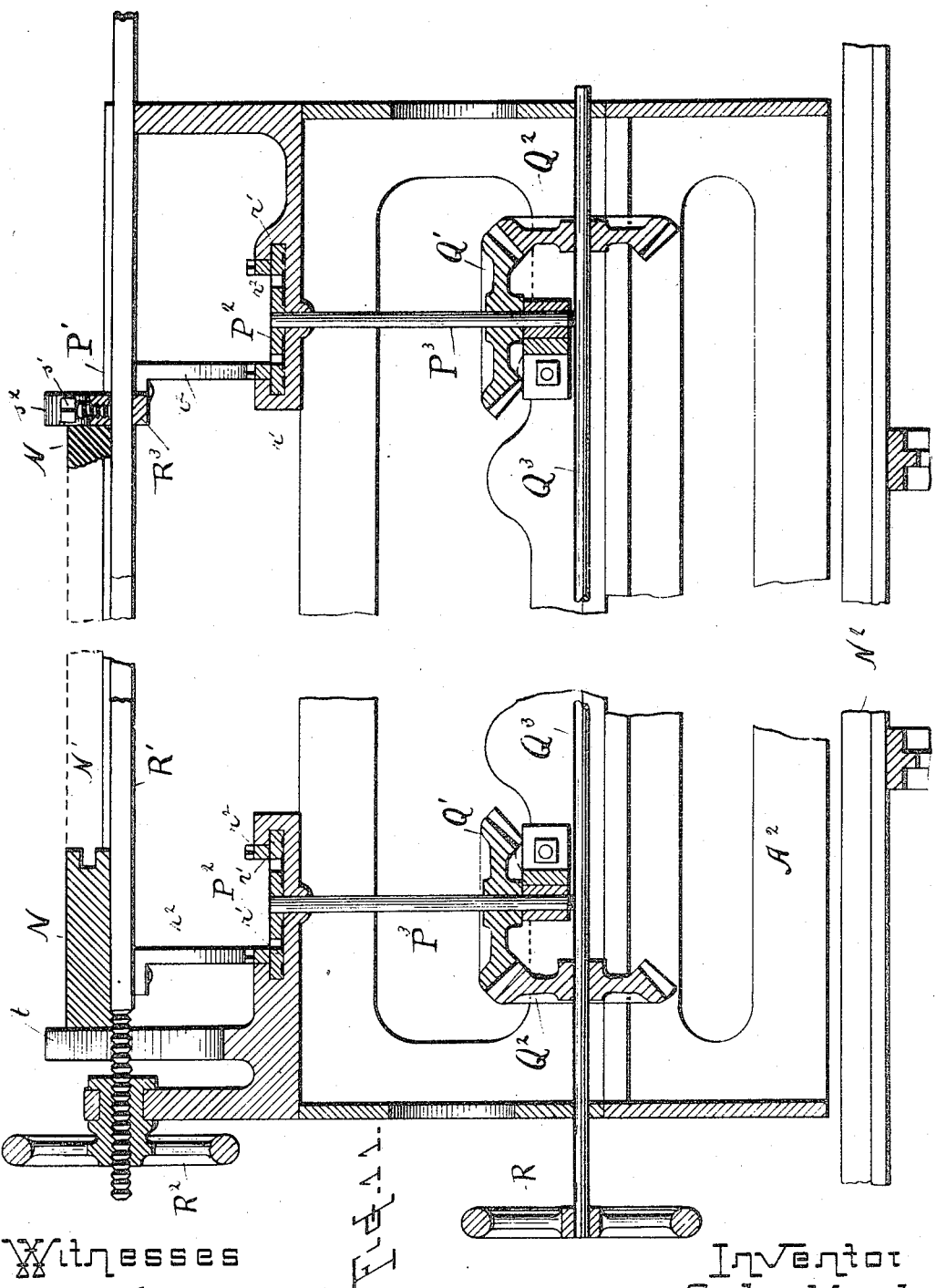

Figure 1 is a general plan view of my invention. Fig. 2 is an elevation of Fig. 1 looking from the left end, showing also an elevation of the counter-shaft by which the power is transmitted to the various parts of the machine. Fig. 3 is a side elevation of Fig. 1, showing in the dotted line the driving belt connected to the bit-carriages. Fig. 4 is a similar side elevation of Fig. 3 with the right-hand portion broken away, showing also an end elevation of the counter-shaft and the driving belts in the dotted line. Fig. 5 is a longitudinal section taken from the dotted line 1—1 of Fig. 1 looking in the direction of the arrows, showing particularly the inner mechanism by which the upper section and the seat of the stile move laterally. Fig. 6 is a side elevation of the removable carriage, upon which the rails are supported, as it appears on the track, after being removed from its bed or normal position for the purpose of adjusting the rails and mullions upon the carriage; showing also an elevation of the track, broken away at its left end. Fig. 7 is a broken detailed elevation taken from the lower right-hand corner of Fig. 3, showing particularly one of the adjustable wedges by which the stiles-seat is vertically adjusted, and a partial view of the outer mechanism, by which the frame is also adjusted. Fig. 8 is a broken detailed elevation taken from the upper right-hand corner of Fig. 3, illustrating the upper broken portion of Fig. 7, showing particularly a side view of the automatic device by which the stiles are rigidly held in place upon the seat while boring the same. Fig. 9 is a broken detailed side elevation taken from the right end portion of Fig. 6, illustrating also the upper portion of the track, showing particularly the lever and its connection by which the removable carriage is vertically adjusted in position. Fig. 10 is a similar illustration of Fig. 9, but showing the carriage elevated. Fig. 11 is a broken detailed view, showing a longitudinal section of the removable carriage cut through its middle length as at dotted line 2—2 of Fig. 1, particularly illustrating the mechanism by which the width of the rails-seat is adjusted; also showing the clamping-bar for the rails and its connections. Fig. 12 is a sectional detailed view taken from line 3—3 of Fig. 1, showing the pulley and its connections for tightening the driving belt; illustrating also the adjusting screw for the wedges and its connections. Fig. 13 is a broken detailed view of the lower right-hand corner of Fig. 2, looking beyond the counter-shaft, showing particularly a sectional view of the clutch and friction-pulley and one of the beveled-gears by which the upper sections and the seats of the stiles are moved laterally. Fig. 14 is a vertical cross section of the carriage taken from the dotted line 4—4 of Fig. 6, showing particularly the guiding-pins and the inner vertical mechanism by which the width of the rails-seat is adjusted; also an elevation of the traction-wheel upon its track. Fig. 15 is a broken vertical cross section taken from the dotted line 5—5 of Fig. 7, showing particularly a portion of one of the adjusting-screws and its outer connection by which the frames are adjusted. Fig. 16 is a corresponding upper section of Fig. 15, but taken from dotted line 6—6 of Fig. 1, looking in the direction of the arrows, particularly showing one of the mechanism by which the upper sections and the stile-seats are moved laterally. Fig. 17 is a top view, showing the right-hand corner broken away of Fig. 1 looking from its right end. Fig. 18 is an end elevation broken away of Fig. 17. Fig. 19 is a top view of Fig. 11, showing the general plan of the removable-carriage, and the manner by which the width of the rail-seat can be adjusted, also a broken portion of the clamping-bar. Fig. 20 is a broken cross section taken from the dotted line 7—7 of Fig. 19, showing particularly the adjustable racks and their connections. Fig. 21 is a detailed view broken away showing one of the mechanisms, by which the upper sections and the stiles are moved laterally. Fig. 22 is a top view of one of the bits-carriage with its track or upper section of the frame broken away. Fig. 23 is a side elevation of Fig. 22. Fig. 24 is a longitudinal section of Fig. 22, taken from the dotted line 8—8, showing particularly the means by which the carriage is adjustably held in place upon the track or the upper section of the frame. Fig. 25 is an isometrical broken view, showing particularly one of the stiles and its adjustable backing. Fig. 26 is an isometrical broken view, showing particularly one of the adjustable sockets and its connections which form part of the automatic device by which the rails and stiles are rigidly held in place upon their respective seats, while boring the same. Fig. 27 is an isometrical view, particularly showing one of the adjustable bars broken away, which forms part of the automatic device by which the rails and stiles are rigidly held in place upon their respective seats.

Like letters of reference denote corresponding parts in all figures of the drawings.

Let A represent the bed or base upon which the two adjustable frames A', and the removable frame $A^2$ placed between the latter are mounted in such a manner that they may be adjusted to the position desired. The various contrivances by which the action of the frames are controlled, may be described as follows:—The frames A' may be firmly fastened or otherwise bolted to beams $a$ shown in Figs. 3, 4, and 5, which are adjustably secured to guiding plates $a'$ interposed across the bed between the latter and the frames and adapted to slide upon these plates between their beveled-projecting-edges or guides $a^2$. These plates may be bolted to the beds or cast as an integral piece if desired. Secured across the space between the frames and the bed, and preferably near each of the sliding-beams just described, is an adjusting screw, which passes beneath the removable frame $A^2$ and connects the two frames A' together for the purpose of adjusting the same according to the width of the door to be bored. One of these screws and its connections to one frame is particularly illustrated in Fig. 15, and consists of rod B, provided with right and left handed threaded portions cut thereon opposite the bottom of each frame A', and secured to the bed by means of brackets $b$. Rigidly fastened to one end of this rod and outside of the bed is a beveled-gear B', the teeth of which mesh with those of the beveled-gear $B^2$ fastened to shaft $B^3$, secured along the side of the bed by means of brackets $b'$. A hand-wheel C is fastened to the end of shaft $B^3$, preferably outside the machine, and serves to rotate it. This feature is particularly illustrated in Fig. 3, and partly in Figs. 4 and 7. The threaded portions of the rod just described may be connected to the frames in any suitable manner, but I prefer to carry out this feature in the manner shown in Fig. 15, where it will be readily seen that a flat bar C', having its ends bent rectangularly, is suitably secured or otherwise bolted beneath each frame across its width, and suitably bolted to the middle of this bar is a downwardly projecting nut, $C^2$, the threads of which mesh with those of that threaded portion of the rod in line opposite the bottom of each frame. Thus constructed, and the hand-wheel being rotated, the shaft B³, through the medium of the beveled-gears B' and B² transmit the desired direction to the rod B, causing the latter to revolve within the nut C², whereupon the latter moves on, and causes the beams $a$ to slide upon their respective guiding plates $a'$, thereby adjusting the frames A' above to the position desired.

The walls of the frame A' are partially cut open for the purpose of reducing the weight of the casting, and in general to give to the body a neater appearance, suitably strengthening braces $b^2$ are secured within the walls within the hollow space, as shown in Figs. 5 and 16. The upper part of these frames are each provided with an upper laterally movable section C³, upon which the various carriages carrying the bits are mounted, as particularly shown in Figs. 3, 4 and 5. Both of these sections, C³, are identical in construction, and operate in the same manner with similar result; they consist, as shown in Figs. 2, 16 and 18 of two horizontal hollow frames, having the upper face cut inwardly in the shape of a _/ to form tracks $c$, while the lower face is open and provided with braces $c'$ bolted to the cross-beams $c^2$, which are interposed between and across the width of sections C³ and the frames A', and constructed and arranged in the same manner, and for the same purpose, as those previously described.

Adjustably secured within the tracks $c$ and upon each section C³ are three carriages, D, provided with bits of suitable size, (the number of these carriages may vary according to the number of rails to be bored); one of these carriages is preferably secured rigidly to one end of each section C³, while the others are adjustably held in position and adapted to slide within the tracks $c$, so that they may be adjusted according to the length of the door to be bored. In Figs. 22, 23, and 24, one of these carriages is illustrated in various ways, it consists of two hollow frames D', provided at its ends with strengthening cross-braces $d$, and beveled downward projections $d'$ fitting into the track $c$, and adjustably secured to the frame of the upper sections by means of bolts $d^2$ passing through the slots $e$ cut centrally within the tracks $c$, so that the various carriages may be adjusted according to the length of the door. The spindles $e'$, provided with suitable bits are journaled to the various carriages in the usual manner, and upon each spindle within the space between the frames, are cog-gears D², the teeth of which mesh together. Suitably secured upon one of the spindles of each carriage is a pulley D³, and immediately above is another pulley E fastened to a suitable shaft and held in place by means of brackets $e^2$ suitably secured to the carriage, as shown particularly in Figs. 16, 22 and 23. Thus constructed and arranged, the driving belt E', as shown in dotted line on Figs. 3, 4 and 5, passes from the counter-shaft $f$ around the inner side of pulley E secured above the carriage, and then around the outer side of the lower pulley D³ fastened to the spindle, and in the same manner to the next carriage; thus transmitting alternately the power to the various spindles through the cog-gears fastened thereon.

At the farther end of the sections near the last carriage, the belt is provided with suitable tightener, and is supported beneath the various carriages by loose pulley $f'$, suitably secured to the other end of the sections. The belt-tightener consists of pulley $f^2$, suitably mounted upon carriage E², which is adapted to slide within the tracks $e$ of the upper section. This carriage, E², is adjustably held in position by means of an adjusting screw $g$, suitably fastened to the middle of the cross-brace E³ of the carriage and passes through the end frame-work of the upper section, and the nut $g'$, provided with hand-wheel, serves to move this carriage to the position desired. This feature is particularly illustrated in Figs. 12 and 17.

On the outer side of each frame A' are two brackets F, upon which the stile-seats are movably secured. These brackets are adapted to slide vertically within the guiding edges $g^2$ of the plate F', which is suitably secured to the frame, as particularly shown in Figs 7 and 8; the vertical sliding-posts or standards F², are secured to the inner side of these frames, substantially in the same manner. To the upper parts of these standards suitable bearing edges $h$ are fastened, upon which the rail-seat supported above the movable frame A² rests while boring the rails.

Both the brackets F and the standards F² of the frames, are adjustable to the position desired by means of wedges $h'$ of bars F³, upon which the lower ends of the brackets and standards rest. These bars are bent rectangularly at one end, and secured to the inner and outer sides of the frame, by means of beveled guides $h^2$. To each rectangular portion of the bars and at the middle, is an adjusting screw threaded rod G, the threads of which correspond with those cut through the bars. One end of these rods is permanently and movably secured to a bow shaped bracket $i$, suitably bolted to the frames, while the other end is provided with a hand-wheel to facilitate its movements, as plainly shown in Figs. 12 and 17. Thus by rotating the screw in either direction, the bars F³, with their wedges $h'$, will be carried forward or backward, according to the direction of the screw, and the brackets F and standards F², will either be depressed or raised as the case may be, to fit the thickness of the stiles and rails. This feature is particularly shown in Fig. 3, and partly in Figs. 4 and 7.

The stile-seats $G^2$, are provided underneath with two cross-plates $i'$, adapted to slide within the groove $i^2$ formed on the upper surface of the brackets F. In practice, the stiles $F^4$ are clamped upon their respective seats, between the stopping-plate J, and the adjustable backing-plate $J'$, as shown particularly in Figs. 16, 17 and 25. These stopping-plates are rectangularly and rigidly secured to the inner edge of the seats, while the backing-plates are adjustably secured to the outer edge of the seats by means of angular plates $J^2$ fastened to the backing-plates and adjustably secured to the seats by means of slot $k$ cut through the plates, and set-screws $k'$, passing through the slot and secured to the seats, as particularly shown in Fig. 25.

Both the upper sections $C^3$, and the stile-seats $G^2$ move laterally at the same time, so that, in practice, the rails and stiles while in position upon their respective seats may be bored simultaneously. To accomplish this the seats must travel twice the space of the upper section, which may be done by the following elements, combined and arranged in the manner hereinafter described:—Two vertical shafts $G^3$ are preferably journaled within the hollow space to the braces $b^2$ of each frame $A'$ in the usual manner, as shown in Figs. 5 and 16. The lower end of these shafts $G^3$, are provided with beveled-gear H which mesh with the teeth of the corresponding beveled-gear $H'$ of the horizontal shaft $H^2$, suitably journaled within and near the bottom edge of the adjustable frames $A'$, and rigidly secured to the end of the shafts $H^2$. Outside of the frames are beveled-gears $H^3$, which mesh with the teeth of the beveled-gears I of the cross-shaft $I'$, secured along the end of the bed, by means of suitable brackets $k^2$, bolted to the bed, while the beveled-gears I may be held upon the cross-shaft, by means of brackets $l$ bolted to the frames, and arranged in such a manner to slide along the shaft, according to the direction of the frames. This feature is particularly illustrated in Fig. 13, where it will be seen that the hubs of gears I project to form a circular depression adapted to fit within the socket $l'$, provided for that purpose on brackets $l$, and the slot $l^2$ cut upon the shaft $I'$, the usual key $m$ binds them together and forms thereby two feather-gears; thus connecting both frames to the shaft $I'$.

A suitable clutch $I^2$, connecting the power from the counter-shaft $f$ to the laterally movable parts of the machine, is provided upon the shaft $I'$, and secured thereon in the ordinary way, as particularly shown in Fig. 13, and a lever $m'$, suitably secured along the side of the bed, controls its movements. This lever is plainly illustrated in Fig. 3, and detailed views 4 and 7.

The counter-shaft $f$ is provided with a suitable pulley, shown in Figs. 2 and 4. The usual loose and stationary pulleys, $m^2$, and $n$ are suitably secured to one end of the shaft, the pulley $n'$ is fastened to the other end connecting the power to clutch $I^2$, while the two pulleys $I^2$, placed between them transmit the power to the bits-carriages D of the two laterally movable sections $C^3$, as previously stated and shown particularly in Fig. 4. These pulleys must be large enough to provide suitable bearing face for the belt $E'$, when the same moves laterally with the upper section $C^3$.

Suitably secured to the upper end of the vertical shafts $G^3$ are cranks M, made preferably in the shape of a disk to form an eccentric, to which the stile-seats, and the upper sections $C^3$, may be connected in various ways to move them laterally. However, I have shown in Fig. 21 a simple and effective method of connecting the same, which consists of bar $M'$ adjustably secured at one end to the disk beyond its center of gravity, while the other end is movably held, by means of suitable bolts secured to, and beneath the upper section. This bar is angularly bent at its middle, so that its two ends may be parallel to the upper section of the disk, and is movably secured to the disk by means of crank $M^2$ secured within the slot $n^2$ cut through the disk, for the purpose of adjusting the bar to the position desired, thereby regulating the lateral travel of the sections and the stile-seat thereon. The crank $M^2$ is provided with a flat portion fitting into the slot $n^2$ of the disk, while the portion beneath the upper rectangular part of the crank to the disk is round and larger in its diameter, the flat portion forms a shoulder $o$ at its lower edge and a nut $o'$, secured to the threaded end serves to clamp the disk firmly between it and the shoulder $o$; thus making the crank rigid to the disk. Suitable washer is secured on each side of connected bar $M'$, for the purpose of reducing the friction. The stile-seat is connected to the crank $M^2$ by means of bar $M^3$, suitably bent beneath the upper section so as to be out of the way while in use, and its ends are movably secured to the crank and beneath the seat, by suitable bolt or rivet $o^2$ and $p$. Thus constructed and arranged, and the power being applied to the cross-shaft $I'$ it transmits the same to the horizontal shafts $H^2$ by means of beveled-gears $H^3$ and I; then to the vertical shafts $G^3$, by means of beveled-gears H and $H'$, causing the disk M and crank $M^2$ to rotate; thus forcing the upper section to move on laterally through the medium of connecting bar M', and likewise the stiles-seat through the medium of connecting bar M². The space from the center of the vertical shafts G³ to the pivoted end of the connecting bars M³ being twice the distance thence from the center of the vertical shaft to the pivoted end of bars M', the seat is naturally carried twice the space of the upper sections, so that while in practice the rails and stiles are bored at the same time, and by the same movement.

Between the two laterally movable frames just described, is a removable carriage, upon which the rails N and the mullions N' of the door are carried and supported in position, above the bed A. This carriage consists of two sections, as particularly shown in Figs. 6 and 14, and detailed views 9 and 10. The lower section is provided with traction wheels, which travel upon the tracks N², bolted or otherwise suitably secured to the bed, and a bracket bolted to the frame provided with bolt, secured to the lower parts of the bracket and the frame forms the axle of the wheels, as particularly shown in Fig. 14. The track N² is long enough for the carriage to be entirely removed from the bed, for the purpose of adjusting the rails upon it. This feature is shown in Fig. 6. The upper section is movably held over the lower section, and the mitering edges of the two sections project inwardly to form suitable guides, which consist of dowel-pins $p'$ rigidly secured to the lower projections, while the upper projections are bored for the insertion of the pins, as shown in Fig. 14. Both the upper and lower sections are provided with suitable braces $p^2$ secured across the hollow space to its wall, and are partially cut open to reduce the weight of the machine.

An adjusting lever N³ provided with suitable handle and pawl $q$, is secured to the lower section and connects with the toothed side of rack O bolted at the end of the upper section in such a manner as to form a guide for the lever. The lever is secured near the end of the lower section, by means of suitable bolt O', which forms its axle. A connecting link $q'$ is movably secured at one end of the upper section, while the other end is movably secured to the lower end of the lever; and a connecting rod O² is fastened at one end of the lever above the axle, while the other end extends to the farther end of the machine and is connected in the same manner to a small lever O³, which is pivoted to the lower section by means of bolt P, which forms its axle, and a link $r$, similar to the one previously described, is then connected to its end, and to the upper section in the same manner. This feature is plainly shown in Fig. 6, and partly in detailed views 9 and 10. A similar arrangement is provided on the other side of the sections, which are connected to the axle bolts O' and P, so that both may work at the same time through the medium of lever N³. Thus constructed, by moving the lever the upper section may be raised to the desired height.

Two toothed racks $r'$ are adjustably secured to each end of the upper section, and corresponding in number are adjustable brackets $r^2$ secured to the racks, to which the rails-seats P' are bolted and supported above the section. The racks and brackets are independently adjustable for the purpose of adjusting the seats according to the length of the rails, or the width of the door. To accomplish this, a pinion-wheel P² is fastened to the end of the vertical shaft P³ and placed between each two racks in such a manner that its teeth mesh with those of the racks. The shaft P³ is held centrally within the hollow space between the walls of the upper section, preferably to braces $p^2$, and near its lower end are beveled-gears Q' gearing with the teeth of beveled-gears Q², fastened upon the horizontal shaft Q³ secured near the lower edge of the upper section; a hand-wheel R fastened to the end of this shaft outside the machine serves to rotate it. These features are particularly shown in Figs. 11 and 14. Thus by turning the hand-wheel, the power is transmitted to the vertical shafts through the medium of beveled-gears Q' and Q², and causes the rail-seats to move according to the direction desired, by means of brackets $r^2$ secured to the toothed racks $r'$, and pinion-wheel P² fastened to the shafts P³, as shown in Figs. 11 and 20, these racks are preferably placed within the depression made upon the upper section, and its sides overlap the outer edge of the rack in such a manner that when the pinion-wheels P² are in place, the racks are safely secured in position, and slide freely within the socket.

The brackets are provided with a slot $s$, and are adjustably bolted to the rack, as particularly shown in Fig. 20, so that if the previously described means are insufficient to enlarge the space between the rails-seats, the brackets could be moved away, thereby obtaining the width desired.

Adjustably secured to the central projecting end of the upper section is a horizontal clamping-bar R' for the purpose of keeping the rails and mullions rigid upon their respective seats. This bar is particularly shown in Figs. 11, 14 and 19, and is provided at one end with a screw threaded portion to correspond with the central screw threaded hub of the hand-wheel R² movably secured to a socket made at the projecting end of the section, while the other end passes through the central aperture cut through the cross-plate R³, which is adjustably secured to the bar by means of a set-screw $s'$. This plate has two upward projections $s^2$ to provide suitable backing for the rails. Thus constructed, when the rails and mullions are in position upon the seat the clamping-bar beneath is brought forward, by means of the hand-wheel, until the rails and mullions are rigidly secured between the stationary projections-$t$, (cast to the other end of the section for the same purpose), and the projecting portions $s^2$ of the cross-plate secured to the clamping-bar R', as particularly shown in Figs. 1, 6 and 11.

Secured to the outer side of the stile-seats are inwardly curved grasping arms S, to prevent the upward shaking of the stiles. Their actions are automatically controlled by the lateral movements of the seats. These arms are fastened at each end of the seat, to the end of the rods S', movably held to the brackets $t'$ bolted beneath the seat, while the other end of the rods are bent rectangularly, and curved inwardly and outwardly in such a manner, that the projecting ends of the curved portions travel upon a downwardly inclined plane $t^2$ bolted to the rib of brackets F, and the spring $u$ fastened beneath the seats keep the rods in position. This feature is particularly shown in Figs. 2, 3 and 4, and detailed views 8, 16, 17 and 18. A longitudinal bar $S^2$ is adjustably secured to the upper end of these arms, by means of slot $u'$ cut through the bar and bolt $u^2$ screwed to the inwardly projecting end of the arms as particularly shown in Fig. 27. Upon this bar, and preferably in a line with the bits, are sockets $S^3$, which are made horizontally adjustable upon the longitudinal bar $S^2$, by means of set-screw $v$, and project downwardly; a bow shaped spring T, provided with an angular plate $v'$ secured rigidly to its back, is vertically adjustably secured to the projecting downward end of this socket, by means of slot $v^2$ and bolt $x$, This completes the grasping device by which the stiles are rigidly secured in position. This feature is plainly shown in Fig. 26.

The longitudinal bar $S^2$ is adjustable for the purpose of adjusting all sockets $S^3$ by the same movement, and at the same time. The rails are provided with similar devices, and for the same purpose as the stile except that the grasping-arms S are secured and controlled by different means. In this case the arms are secured to the standard T' bolted to the ends of frames A' near their inner side, and project almost rectangularly upon the edge of the upper laterally movable sections $C^3$. The end of the projections are provided with an anti-friction wheel or roller, which is adapted to travel upon the inwardly inclined plane $T^2$, suitably secured to the upper section $C^3$. A standard $T^3$ is secured or otherwise cast as an integral part of the projection beyond the pivoted end of the grasping-arms, and a spring U is secured to its upper part, and the standard T' holds the arms in position. Arranged and constructed in this manner, when the upper sections $C^3$ travel laterally, the incline planes $T^2$ secured at the ends, force the friction-wheel to roll upon and cause the arms to drop downward, and press against the rails; while the upper sections move they carry with them in the same direction the stile-seats, and forcing the curved end of the rods S' to slide upon the inclined plane $f^2$, and causing the grasping-arms S to drop downward upon the stiles. Thus both the stiles and rails are rigidly secured until released by the return movement of the upper sections and the seats.

In order that a comprehensive understanding of the value of my invention may be had, I will give a brief "résumé" of its workings when in operation. The two frames A' mounted upon the bed A are adjusted according to the size of the door by means of the hand-wheel C, shown particularly in Fig. 3, which transmits the power to the adjusting-screw secured between the frames and the bed, and its connections to the frames cause the same to move to the position intended, and the travel of the lateral movable sections $C^3$ above is adjusted according to the depth of the holes to be bored, through the medium of the cranks $M^2$ and its connections secured to the disk M. The stiles-seats $G^2$ and the bearing edges $h$ mounted upon the brackets F and the standards $F^2$ secured to the inner and outer sides of the frame A' are then adjusted to the thickness of the stiles and rails to be bored by means of hand-wheel G' secured to the adjusting bar $F^3$, as shown in the figure just mentioned; thus forcing the latter with its wedges $h'$ to move forward and thereby causing the brackets F and the standards $F^2$ to move vertically to the desired position. The space between the rails-seats P' of the removable carriage is adjusted to the length of the rails or width of the door by means of the hand-wheel R secured to the horizontal shaft $Q^3$, transmits the power to the pinion-wheel $P^2$ and causes the racks $r'$ with the brackets $r^2$ supporting the rails-seats above to move within their respective sockets, as particularly illustrated in Figs. 6, 11 and 19. Then the adjusting lever $N^3$ of the removable carriage is forced downward and causes the rails-seats with the upper section to move vertically out of bearing edges $h$. Thus the rails-seats being released, the carriage is then removed from its normal position and the rail N and the mullion N' are placed upon it, as shown in Figs. 6 and 14; whereupon they are clamped together by means of horizontal clamping-bar R'. Then the carriage is returned to its former position upon the bed A, and the adjusting lever $N^3$ being released from its rack causes the rails-seats P' to drop upon the bearing edges $h$. This being done, the stiles are placed upon their respective seats between the stopping-plate $J$ and the adjustable plate $J'$, the latter being adjusted to fit the width of the stiles, as particularly shown in Fig. 24. The grasping-arms S adjusted, the bits-carriages are then placed in position opposite the rails; thus completing the adjustment of the various adjustable parts of the machine according to the size of the door. The power from the counter-shaft $f$ being transmitted to the various pulleys secured upon the bits-carriages cause the cog-gears $D^2$ to rotate, thus transmitting the power to the bits. Then the operator who stands preferably at the right-hand corner shown in Fig. 3, reverses the lever $m'$ connected to the clutch, causing thereby the power to be applied to the cross-shaft $I'$ which transmits the same to the disks M and forces the upper sections $C^3$ to move laterally toward the other through the medium of connecting-bars $M'$. Likewise the seats $G^2$ which have to move twice the space of the section by means of bar $M^3$ and its connections also secured to the disk, thus boring the stiles and rails simultaneously. This being done, the lateral movable sections are then returned to their normal position by the return movement of the disk; whereupon the rails and stiles are removed and the machine is ready to repeat the operation. The upper sections $C^3$ with the seats $G^2$ by their lateral movement, force the rod $S'$ to slide upon the inclined plane $t^2$ secured to the rib of brackets F, causing thereby the grasping-arms S fastened to the end of the rod to drop downward upon the stiles, thus holding them in position while boring the same. Likewise the projecting end of the grasping-arms of the rails travel upon the inclined plane $T^2$ secured to the end of the upper sections, $C^3$ and cause the grasping-arms to drop downward upon the rails.

It will be easily conceived from the above description that numerous changes in the construction and arrangement of the various parts of my machine can be made without departing from the scope of my invention.

My invention may be used to bore the several parts of a door in different ways than those described. For instance, all the various parts which compose an ordinary door may be placed on the rails-seats of the removable carriage and the travel of the laterally movable section adjusted in such a manner that both the ends of the rails and the stiles may be bored jointly. Then the carriage may be moved from its normal position and dowel-pins inserted within the holes, thus completing the door. This method will be found to be very desirable in the manufacture of cheap doors.

Believeing I have produced a valuable improvement in "boring-machine," and having thus described the same, what I claim as my invention and desire to secure by Letters Patent of the United States is:—

1. A boring-machine comprising a central and two lateral work-supports, in combination with two reciprocating tools carrying sections interposed between the work-supports.

2. A boring-machine adapted for the purpose of boring simultaneously both the ends of door-rails, comprising vertical adjustable seats, in combination with two adjustable and laterally movable frames provided with suitable bits adjustably mounted thereon and means whereby the rails can be automatically held rigidly upon the seats while boring the same.

3. A boring-machine adapted for the purpose of boring simultaneously the rails and stiles of doors, comprising two adjustable and laterally movable frames provided with suitable bits secured thereon and two adjustable and laterally movable seats for the stiles, in combination with a removable and adjustable carriage for the rails.

4. A boring-machine, comprising two laterally movable frames adjustably mounted upon a suitable bed or base and provided with adjustable tool carriages, and a removable frame secured between said adjustable frames and provided with means whereby the various parts of doors can be held in position.

5. A boring-machine comprising two adjustably mounted frames each having an upper laterally movable section adjustably mounted thereon and provided with adjustable tool carriages, and a removable frame secured between the adjustable frames and provided with suitable seats adjustably secured thereon.

6. A boring-machine comprising two laterally movable frames adjustably mounted upon a suitable bed or base, adjustable seats for the stiles, means to move said seats laterally, tool carriages adjustably secured upon the frames, a removable frame arranged between the adjustable frames and having adjustable brackets for supporting the rails and mullion in position above the removable frame.

7. A boring-machine adapted for the purpose described, comprising two adjustably mounted frames and provided with adjustable and laterally movable seats for the stiles, an upper laterally movable section adjustably mounted upon each frame and provided with adjustable tool carriages, and a removable frame secured between the adjustable frames and provided with adjustable seats for the rails and mullions.

8. In a boring-machine, a suitable base, adjustable frames mounted upon said base, an upper reciprocating section adjustably mounted upon said frames and provided with tracks and tool carriages adjusted within said tracks.

9. In a boring-machine, adjustable frames, an upper laterally movable section adjustably mounted upon each frame and having its upper face provided with a slotted track, and carriages engaging said tracks and provided with adjusting means comprising a bolt arranged within the slot of the track.

10. In a boring-machine, a central and two lateral reciprocating and adjustable work-seats, in combination with reciprocating sections mounted between the seats and provided with suitable tools secured thereon.

11. A boring-machine comprising a central and two lateral reciprocating seats, adjustable frames mounted between said seats and having a suitable base, reciprocating tool-carrying sections mounted upon said frames.

12. A boring-machine comprising a central and two lateral seats, adjustable frames mounted between said seats and having a suitable base, and reciprocating tool-carrying sections mounted upon said frames.

13. In a boring-machine two reciprocating tools carrying sections, adjustable frames upon which the same are mounted, a base, lateral work-supports secured to said frames and a central work-support secured between said frames, in combination with means for adjusting said frames comprising a suitable rod secured to the base and having right and left handed threads cut thereon, nuts secured to the frames and engaging with the threads of the rod and means for rotating said rod.

14. In a boring-machine, a suitable base, two adjustable frames mounted upon said base and having lateral work-supports, reciprocating tool-carrying sections mounted upon said frames and a central work-support secured between said frames, in combination with an adjusting device, for said frames, comprising a rod secured to the base and having right and left handed threaded portions thereon, projecting nuts suitably secured to the frames and engaging the threaded portions of the rod and means for transmitting power to said rod having an actuating shaft provided with means by which it may be turned manually and connective gears between the shaft and rod.

15. In a boring-machine, a reciprocating tool-carrying section, a laterally adjustable frame upon which the same is mounted, a base, a vertically adjustable work-support secured to said base, and means for reciprocating said section and for adjusting the frame.

16. A boring-machine provided with an upper reciprocating section mounted upon an adjustable frame, means to move said section, consisting of a vertical shaft secured to the adjustable frame and provided with a beveled-gear H at its lower end and a disk at its upper end, a connecting bar secured to said disk and section, a second shaft, a beveled-gear secured thereto and suitable means to transmit the power to the second shaft.

17. In a boring-machine provided with an upper section mounted upon an adjustable frame and with means to move said section laterally, comprising a vertical shaft provided with a beveled-gear and a disk, a connecting bar adjustably secured to said disk and section, a second shaft, beveled-gear secured to the second shaft, and means for transmitting the power to the latter shaft, having a cross shaft and a feather-gear and clutch secured to the cross-shaft.

18. In a boring-machine, upper laterally movable sections, adjustable carriages secured to said sections, and provided with reversed bits, means for rotating said bits, having spindles, a counter-shaft provided with suitable pulleys, driving-belt E', and pulley E suitably journaled above the carriages, pulleys fastened to the spindles, a tightening pulley mounted upon said carriages, and a supporting pulley journaled to the frame.

19. A boring-machine comprising a plurality of interposed upper laterally movable sections mounted upon suitable frames, and having a series of double ended bits journaled upon said upper sections, in combination with a central support and with lateral work-support mounted upon said frames.

20. A boring-machine comprising two reciprocating sections mounted upon laterally adjustable frames having a suitable base, work-seats comprising a central section mounted upon said base, two lateral sections, mounted upon said frames, double ended tools mounted upon the reciprocating sections and means to reciprocate said sections.

21. A boring-machine comprising two reciprocating sections mounted upon laterally adjustable frames having a mutual base and means for reciprocating the sections, a work-seat vertically adjustably secured, between the two reciprocating sections, to said base, and tool carriages longitudinally adjustably mounted upon said reciprocating sections and having tools secured thereon, all of which arranged and combined in the manner and for the purpose specified.

22. In a boring machine, a plurality of work supports, one of which is reciprocatorily mounted and a reciprocatory tool carriage mounted between the work supports and having means for presenting tools toward the same.

23. In a boring machine, a plurality of work supports one of which is reciprocatorily mounted, a reciprocatory tool carriage mounted between the work supports and means for reciprocating the reciprocatory work support and tool carriage, adapted to move one a greater distance than the other.

24. In a boring machine a work support, a plurality of work supports movable toward and from the same and arranged on opposite sides thereof, and a reciprocatory tool carriage between each of the latter supports and the one first-mentioned, each of said carriages having means for carrying tools presented in opposite directions therefrom.

25. In a boring machine a work support, a plurality of work supports movable toward and from the same and arranged on opposite sides thereof, and a reciprocatory tool carriage between each of the latter supports and the one first-mentioned, each of said carriages having means for carrying tool presented in opposite directions therefrom, in combination with means for reciprocating the tool carriages and reciprocatory work supports, comprising an actuating means and connections between the same and said carriages and supports, said connections adapted to move the work supports a distance different from that imparted to the tool carriages.

26. A boring-machine adapted for the purpose of boring simultaneously the rails and stiles of doors, comprising two laterally adjustable frames mounted upon a suitable base and having vertically adjustable and laterally movable seats for the stiles secured thereon, means for moving said seats laterally, adjustable and laterally movable tool-supporting means mounted upon said frames and suitable seats for the rails adjustably secured between the frames.

27. A boring-machine adapted for the purpose of boring simultaneously the rails and stiles of doors, comprising two reciprocating sections mounted upon slidable frames and provided with double-ended bits secured thereon, and two laterally movable seats for the stiles secured to said frames, in combination with suitable seats for the rails secured between said reciprocating sections.

28. In a boring-machine adapted for the purpose described, two upper tools carrying sections mounted upon horizontally adjustable frames, vertically adjustable work-seats for the rails placed between the sections, vertically adjustable and automatically reciprocating seats for the stiles, and means for adjusting said seats.

29. In a boring-machine upper lateral and reciprocating tool carrying sections mounted upon adjustable frames, means for reciprocating said sections, vertically adjustable seats for the stiles secured to said frames, means to move said seats laterally, and a central section provided with suitable seats for the rails.

30. In a boring-machine upper lateral and reciprocating tool carrying sections mounted upon frames having a base and automatic reciprocating seats for the stiles, in combination with a central carriage provided with seats for the rails and means for vertically adjusting said seats in position.

31. In a boring-machine adapted for the purpose described, a frame, seats for the stiles and rails, in combination with means for adjusting said seats simultaneously, comprising a bar, bent rectangularly and threaded at one end and provided with wedges, a screw threaded rod meshing with the threads in the rectangular part of the bar and secured at one end to the frame and means to rotate said rod.

32. In a boring-machine provided with an upper section and seat for the stiles; means to move said section and the seat laterally, comprising a shaft provided with a disk and means to rotate the shaft, a connecting bar adjustably secured to the disk and the section, connecting bar suitably secured to the seat and the disk, and means for adjusting and regulating simultaneously the travel of the seat and the upper section.

33. A boring-machine provided with an upper laterally movable section a laterally movable seat for the stiles, and means to regulate simultaneously the lateral movement of the seat and the section comprising a shaft provided with a disk having a slot, means to rotate said shaft, an adjusting crank fastened within said slot, a connecting bar secured to the section and crank, and a connecting bar secured to the seat and crank.

34. A boring-machine comprising two upper lateral tool-carrying sections mounted upon adjustable frames and provided with suitable seats for the stiles, projecting rectangularly and upwardly at their inner edges and having an adjustable backing secured near their outer edges, and a central section supporting the rails.

35. In a boring-machine a central and two lateral adjustable work-supports, in combination with reciprocating tool sections, interposed between the work-supports and means for reciprocating the sections and adjusting the work-supports.

36. A boring-machine comprising two laterally movable work-seats, having adjustable backing, two reciprocating tool-carrying sections mounted upon laterally adjustable frames between the movable work-seats, and a central frame mounted between the reciprocating section, having a suitable seat arranged and combined to operate for the purpose set forth.

37. A boring-machine having upper reciprocating sections mounted upon a suitable base and provided with double ended tools, laterally movable seats secured to said base, having suitable backing edges, a central section provided with seats and combined means to reciprocate the sections and the laterally movable seats.

38. A boring-machine having two reciprocating tool-carrying sections, mounted upon a suitable base and a vertical adjustable frame mounted between said sections, in combination with horizontally adjustable seats, comprising standards mounted upon said frame and provided with bearing edges and means to adjust said standards.

39. A boring-machine having two reciprocating tool-carrying sections mounted upon laterally adjustable frames, in combination with a central frame mounted between the sections, comprising a lower section and an upper vertically adjustable section, provided with seats mounted thereon.

40. A boring-machine comprising two reciprocating tool-carrying sections mounted upon laterally adjustable frames, work-seats mounted upon a central carriage consisting of a lower section and an upper vertically adjustable section and means for adjusting said section.

41. In a boring-machine two laterally movable sections mounted upon horizontally adjustable frames in combination with a removable carriage mounted between said sections, said carriage having a lower section and an upper vertically adjustable section, and a guiding device comprising a dowel-pin secured to one section and a socket secured to the other section.

42. A boring-machine comprising two laterally reciprocating sections mounted upon a suitable base, boring tools mounted upon said sections, suitable tracks arranged longitudinally upon said base between said reciprocating sections, and a removable carriage having work-seats and provided with antifriction wheels or rollers mounted upon said tracks.

43. In a boring-machine, two laterally reciprocating frames mounted upon a suitable base, a removable carriage mounted between said frames and composed of a lower section and an upper vertically movable section, and means to raise said upper section, comprising a lever pivoted near one end of the lower section and provided with a pawl, a rack having guiding means for the lever and suitably secured to the upper section and provided with toothed side for the pawl of the lever, a connecting link movably secured to the lower end of the lever and the upper section, a lever pivoted to the other end of the lower section and provided with a connecting link movably secured to its end and the upper section, and a connecting rod pivotally secured to the levers.

44. A boring-machine comprising two laterally reciprocating tool-carrying sections mounted upon laterally adjustable frames, a central work-support placed between the sections and composed of a lower section and an upper vertically adjustable section, horizontally adjustable clamping seats for the work mounted upon suitable brackets secured to said upper section and means for adjusting said seats and clamping the work.

45. A boring machine having two laterally movable tool sections, mounted upon adjustable frames, in combination with a removable work-support mounted between said sections.

46. A boring-machine comprising a central section and two reciprocating lateral tool-carrying sections, work-seats, horizontally adjustable brackets secured to the central section and carrying the work seats; and means for adjusting said seats comprising inwardly toothed racks formed upon the brackets, a pinion meshing with the teeth of the racks and means to rotate said pinion.

47. In a boring-machine adapted to manufacture doors, a longitudinal carriage composed of an upper section vertically and adjustably mounted upon a lower section, seats for the rails mounted upon suitable brackets adjustably secured to the longitudinal sides of the upper section, projections formed at one end of the upper section and extending above the rails-seats, a longitudinal bar adjustably and centrally secured upon the upper section below the seats, and a suitable backing secured to said bar.

48. A boring-machine having a central removable and two lateral reciprocating tool-carrying sections mounted upon a suitable base, and work-seats mounted upon said central section, in combination with an adjustable clamping device secured to said central section.

49. A boring-machine provided with frames having a suitable base, laterally movable sections adjustably secured upon said frames, vertically adjustable brackets secured to said frames, laterally movable seats secured to said brackets and an automatic holding device secured to the seats.

50. A boring-machine provided with frames having a suitable base, upper laterally movable sections, adjustably secured upon said frames, vertically adjustable brackets suitably secured to said frames, laterally movable seats secured to said brackets, and automatic holding means comprising grasping arms, a rod to which the same are connected, said rod arranged beneath the seat and provided with a spring and an inclined plane secured to said bracket.

51. A boring-machine composed of two upper reciprocating sections mounted upon horizontally adjustable frames, having a suitable base, in combination with a vertically adjustable carriage mounted between the reciprocating sections.

52. A boring-machine adapted for the purpose of boring simultaneously the stiles and rails of doors, comprising two laterally reciprocating frames mounted upon a suitable base and provided with suitable bits secured thereon, two adjustable and laterally reciprocating seats for the stiles, and a carriage mounted between the laterally reciprocating frames and provided with adjustable seats for the rails.

53. A boring-machine adapted to bore simultaneously the stiles and rails of doors, having two reciprocating sections mounted upon adjustable frames and provided with adjustable bits mounted thereon, and a vertically adjustable seat mounted between said frames and provided with means whereby the rails and stiles can be clamped in position while boring the same.

54. A boring-machine having two laterally movable tool-carrying sections mounted upon adjustable frames, in combination with a vertically adjustable seat secured between said adjustable frames, and provided with means whereby the various parts of doors can be automatically held in position and bored simultaneously.

55. A boring-machine having a central work-holder and two laterally adjustable frames mounted upon a suitable base and means for adjusting said frames upon the base, in combination with two reciprocating tools carrying sections mounted upon said frames.

56. A boring-machine having two parallel sections each reciprocating upon an adjustable frame and a central and two lateral work-seats mounted upon a suitable base, in combination with double ended spindles adjustably secured upon the parallel sections, and having bits secured at their ends, and means for transmitting the power to each spindle.

57. In a boring-machine having a reciprocating section mounted upon an adjustable frame, double ended spindles journaled thereon, bits secured at the ends of said spindles, work-seats mounted opposite the ends of said spindles and means to transmit the power to said spindles, consisting of spur-gears fastened to said spindles.

58. A boring-machine having two adjustable and reciprocating sections provided with tools secured thereon, in combination with a central and two lateral work-seats.

59. A boring-machine having two upper reciprocating sections mounted upon horizontally adjustable frames, double-ended bits secured to said sections, a vertically adjustable central section having seats mounted thereon, lateral seats vertically adjustably mounted upon said frame and means to reciprocate said sections.

60. A boring-machine provided with upper reciprocating tool-carrying sections mounted upon suitable frames, a central section mounted between the reciprocating sections and having seats thereon, movable seats mounted laterally upon said frames and means to reciprocate said sections.

61. A boring-machine provided with a central carriage and upper reciprocating lateral tool-carrying sections mounted upon suitable frames, and reciprocating seats mounted upon said frames and adapted to travel twice the space of the upper sections.

62. In a boring-machine, a central seat mounted upon a suitable frame, in combination with upper reciprocating lateral tool-carrying sections mounted upon said frame, and reciprocating seats mounted upon said frame.

63. A boring-machine provided with upper reciprocating tool-carrying sections mounted upon suitable frames, a central work-holder mounted between said sections, reciprocating seats mounted upon said frames and means to regulate the travel of the seats and the upper sections.

64. In a boring-machine, a removable frame comprising a lower section and an upper vertically adjustable section, having horizontally adjustable seats mounted thereon, in combination with lateral reciprocating tools carrying sections.

65. In a boring-machine, a central frame comprising a lower section and an upper vertically adjustable section, having horizontally adjustable seats mounted thereon, and means for adjusting the upper section and the seats, in combination with lateral reciprocating tools carrying sections.

66. A boring-machine provided with two adjustable frames and a carriage secured between said frames, in combination with adjustable seats mounted upon said frames and carriage, and reciprocating tools presenting in opposite directions between the seats on the frame and on the carriage.

67. A boring-machine having two parallel reciprocating tool sections, in combination with a central and two lateral reciprocating work-seats.

68. In a boring-machine provided with two lateral and a central removable work-support in combination with interposed reciprocating tools carrying sections.

69. In a boring-machine, the combination of two opposed complementary structures, each including a base, a movable bed, a reciprocating boring mechanism carrier, and means for supporting material to be bored in relation to said carriers, a carriage traversing the space between the carriers, respective connective means between the beds and between the carriers, for reciprocating said beds and carriers, said connective means between the former including a worm-shaft journaled in the bases and having oppositely pitched threads at i†s two ends, and means on the beds engaging the threaded portions of said shaft whereby the beds are drawn toward or moved from each other simultaneously.

7(. In a boring-machine, the combination of two opposed complementary structures each including a base, a movable bed, a reciprocating boring-mechanism carrier, means for supporting material to be bored relative to said carriers, means including a reciprocating conveyer for delivering material between the carriers, connective means between the beds and between the carriers for reciprocating them simultaneously, said means for the carriers, including a feather shaft 48, beveled gears slidable on said shaft and crank mechanism operatable through engagement with said gears.

In testimony whereof I affix my signature in presence of two witnesses, this 16th day of November 1896.

ANTON HASSLER.

Witnesses:
E. F. GARRISON,
V. A. BOELL.